US008621395B2

(12) United States Patent
Bau

(10) Patent No.: US 8,621,395 B2
(45) Date of Patent: Dec. 31, 2013

(54) PREDICTIVE HOVER TRIGGERING

(75) Inventor: David Bau, Lincoln, MA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/183,035

(22) Filed: Jul. 14, 2011

(65) Prior Publication Data

US 2012/0017182 A1 Jan. 19, 2012

Related U.S. Application Data

(60) Provisional application No. 61/365,445, filed on Jul. 19, 2010.

(51) Int. Cl.
*G06F 3/048* (2013.01)
*G06F 3/033* (2013.01)

(52) U.S. Cl.
USPC ............ 715/859; 715/856; 715/857; 715/858

(58) Field of Classification Search
USPC ........................... 715/856–859; 345/157, 159
See application file for complete search history.

(56) References Cited

U.S. PATENT DOCUMENTS

| | | | | |
|---|---|---|---|---|
| 4,987,411 | A * | 1/1991 | Ishigami ....................... | 345/159 |
| 5,598,183 | A * | 1/1997 | Robertson et al. ............ | 715/856 |
| 5,737,555 | A * | 4/1998 | Gregg et al. .................. | 715/856 |
| 5,870,079 | A * | 2/1999 | Hennessy ..................... | 345/159 |
| 6,323,884 | B1 | 11/2001 | Bird et al. | |
| 6,362,842 | B1 | 3/2002 | Tahara et al. | |
| 6,995,746 | B2 * | 2/2006 | Aymeric ....................... | 345/156 |
| 8,127,253 | B2 * | 2/2012 | Sauve et al. .................. | 715/856 |
| 8,330,717 | B2 * | 12/2012 | Kawakami et al. ........... | 345/157 |
| 2002/0075315 | A1 * | 6/2002 | Scott ............................. | 345/802 |
| 2003/0016252 | A1 | 1/2003 | Noy et al. | |
| 2007/0067744 | A1 * | 3/2007 | Lane et al. .................... | 715/860 |
| 2008/0154718 | A1 * | 6/2008 | Flake et al. ..................... | 705/14 |
| 2011/0230238 | A1 * | 9/2011 | Aronsson et al. ............. | 455/566 |

FOREIGN PATENT DOCUMENTS

WO WO 2005/081096 A2 9/2005

OTHER PUBLICATIONS

Asano et. al., "Predictive Interaction using the Delphian Desktop," ACM, UIST'05, Oct. 23-27, 2005, Seattle, Washington, USA, pp. 1-9.*
International Search Report for Application No. PCT/US2011/044027, mailed Oct. 17, 2011, (4) pages.
Thornwood, "*Method for Simplifying the Accurate Positioning of a Mouse Pointer*," IBM Technical Disclosure Bulletin, NN Corp., US, vol. 36, No. 4, Apr. 1, 1993, pp. 339-341, XP000364539, ISSN: 0018-8689.

* cited by examiner

*Primary Examiner* — Kieu Vu
*Assistant Examiner* — Asteway T Gattew
(74) *Attorney, Agent, or Firm* — Lerner, David, Littenberg, Krumholz & Mentlik, LLP

(57) ABSTRACT

A method of triggering a hover event for a pointer in a user interface on a display device begins by predicting a future position of the pointer on the user interface. A likelihood that the pointer will hover over a screen object is determined based on the predicting. Finally, a hover event for the screen object is triggered based on the determined likelihood that the pointer will hover over the screen object.

15 Claims, 17 Drawing Sheets

FIG. 1 - Prior Art

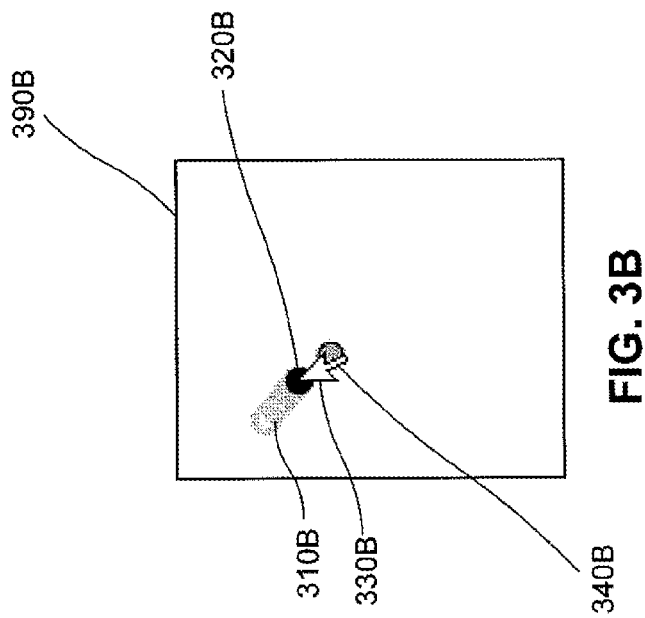
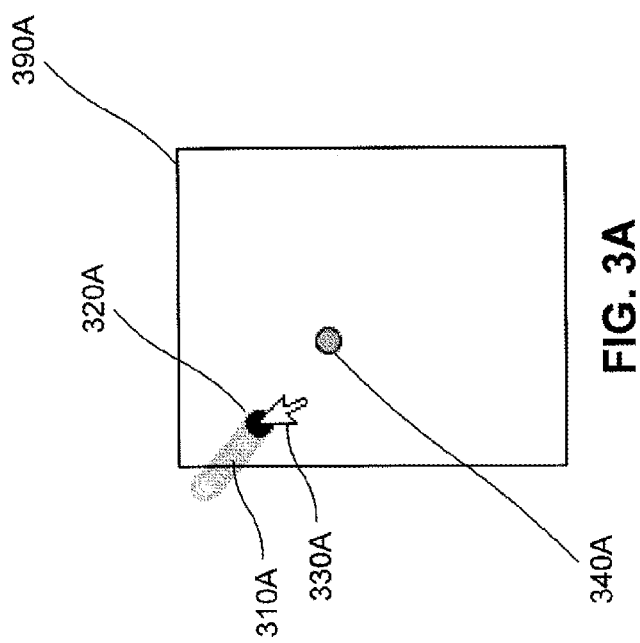

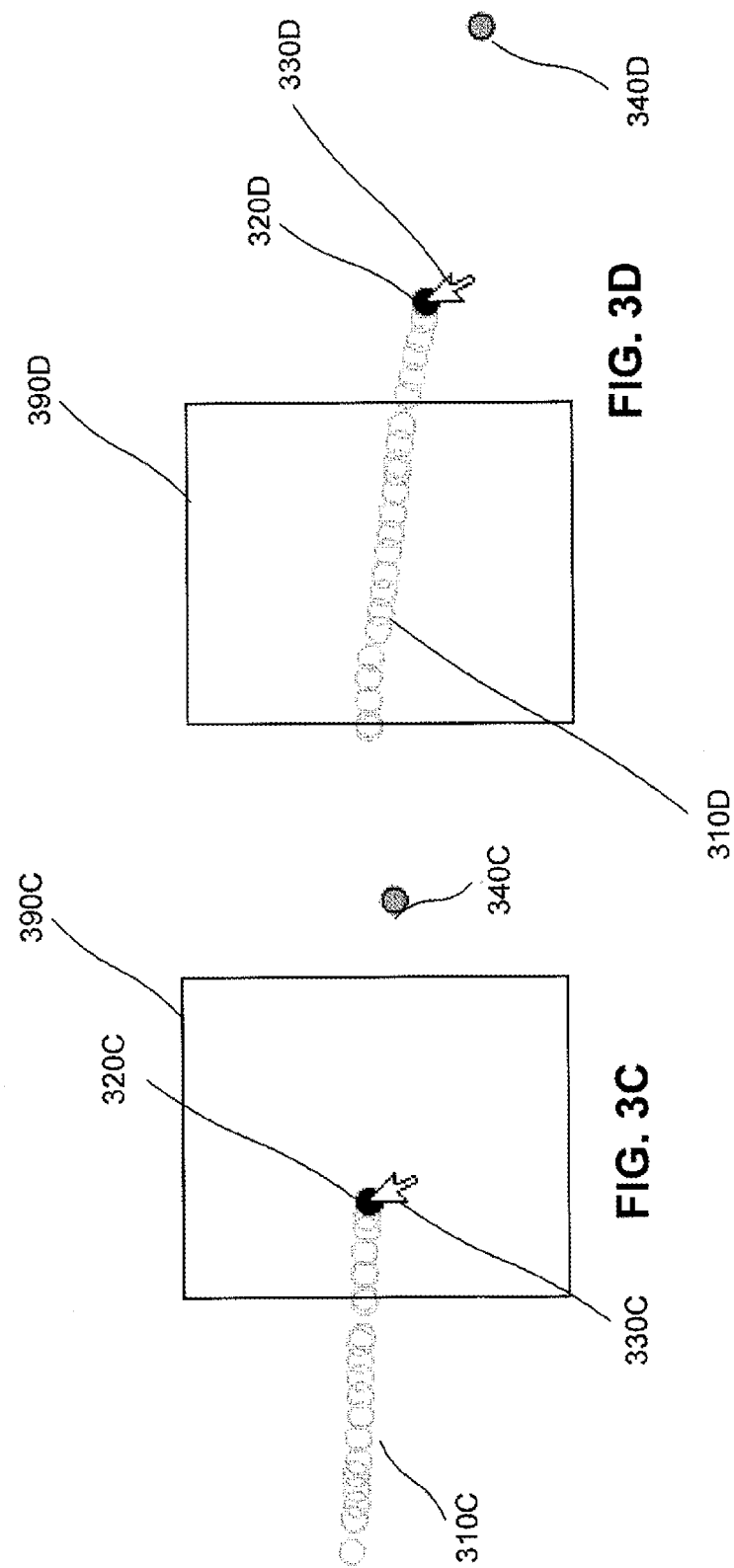
FIG. 3C-D

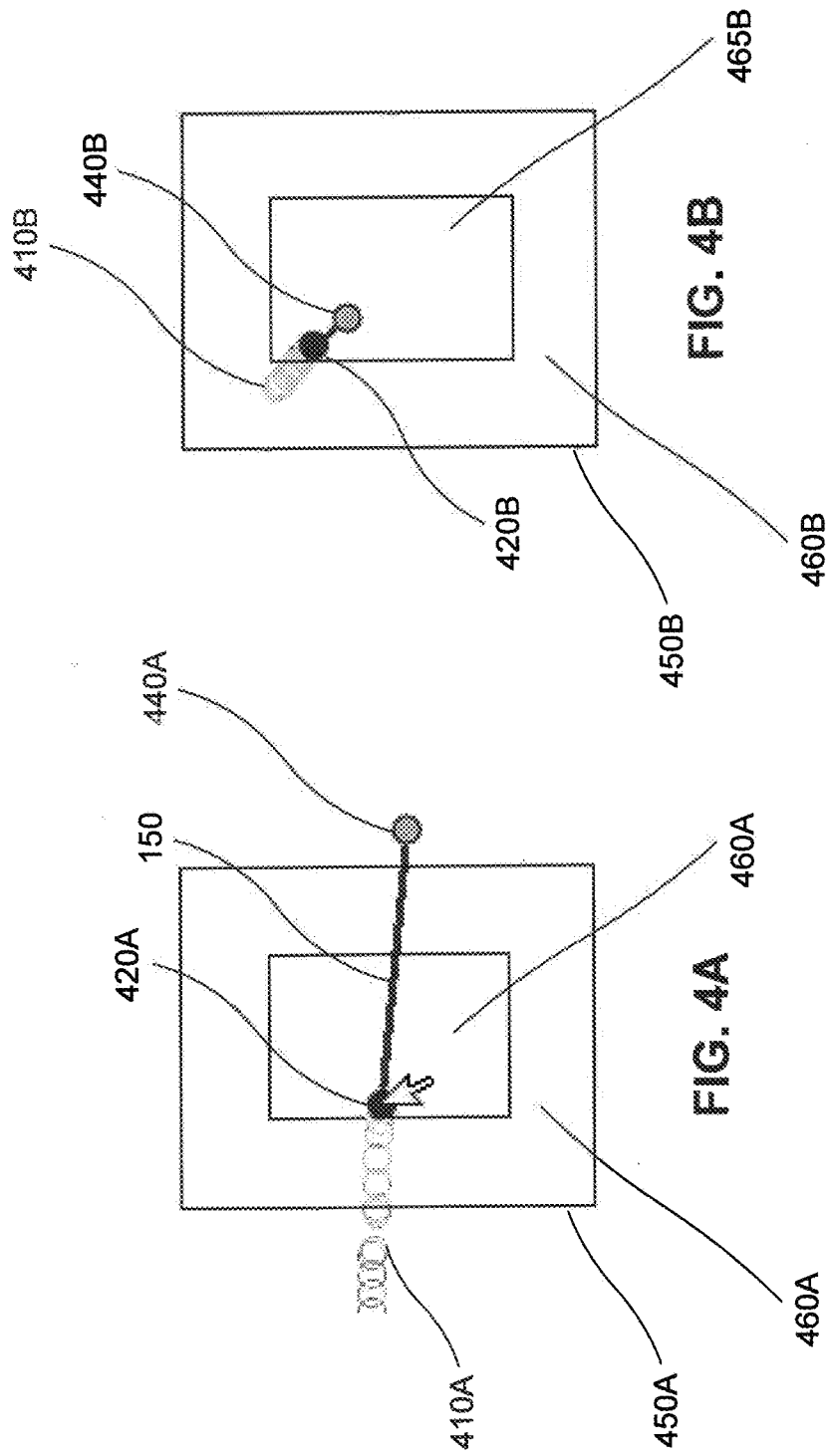

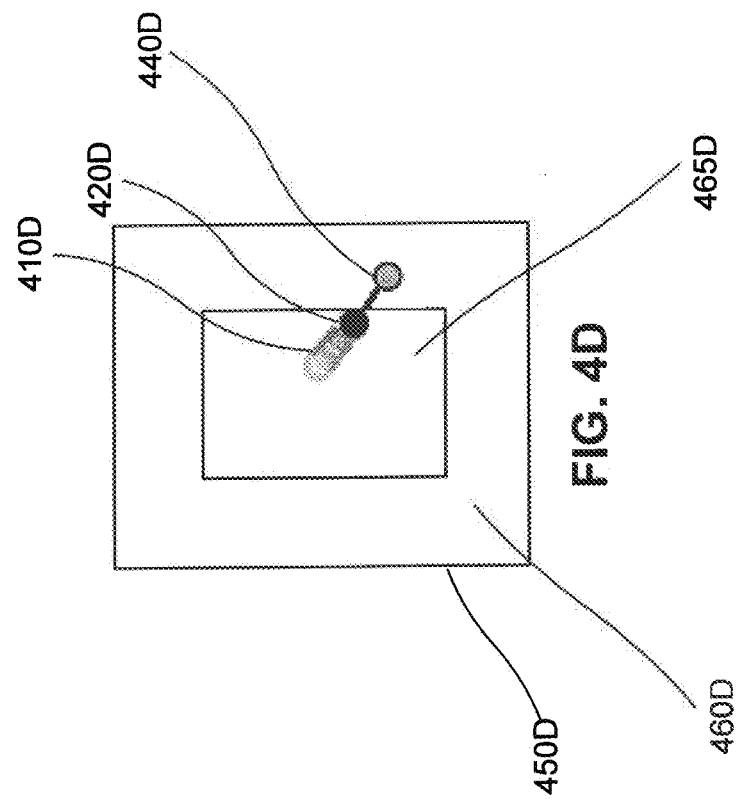
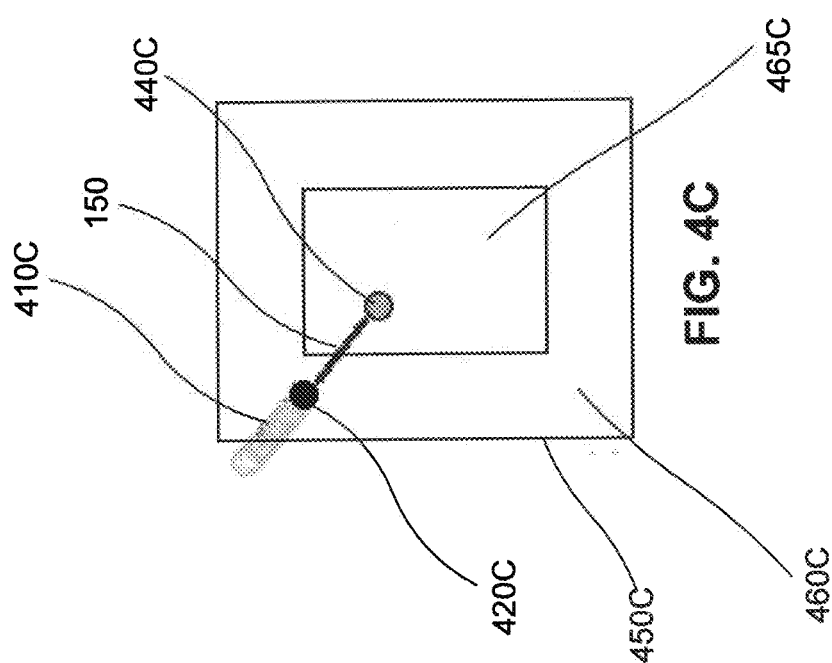

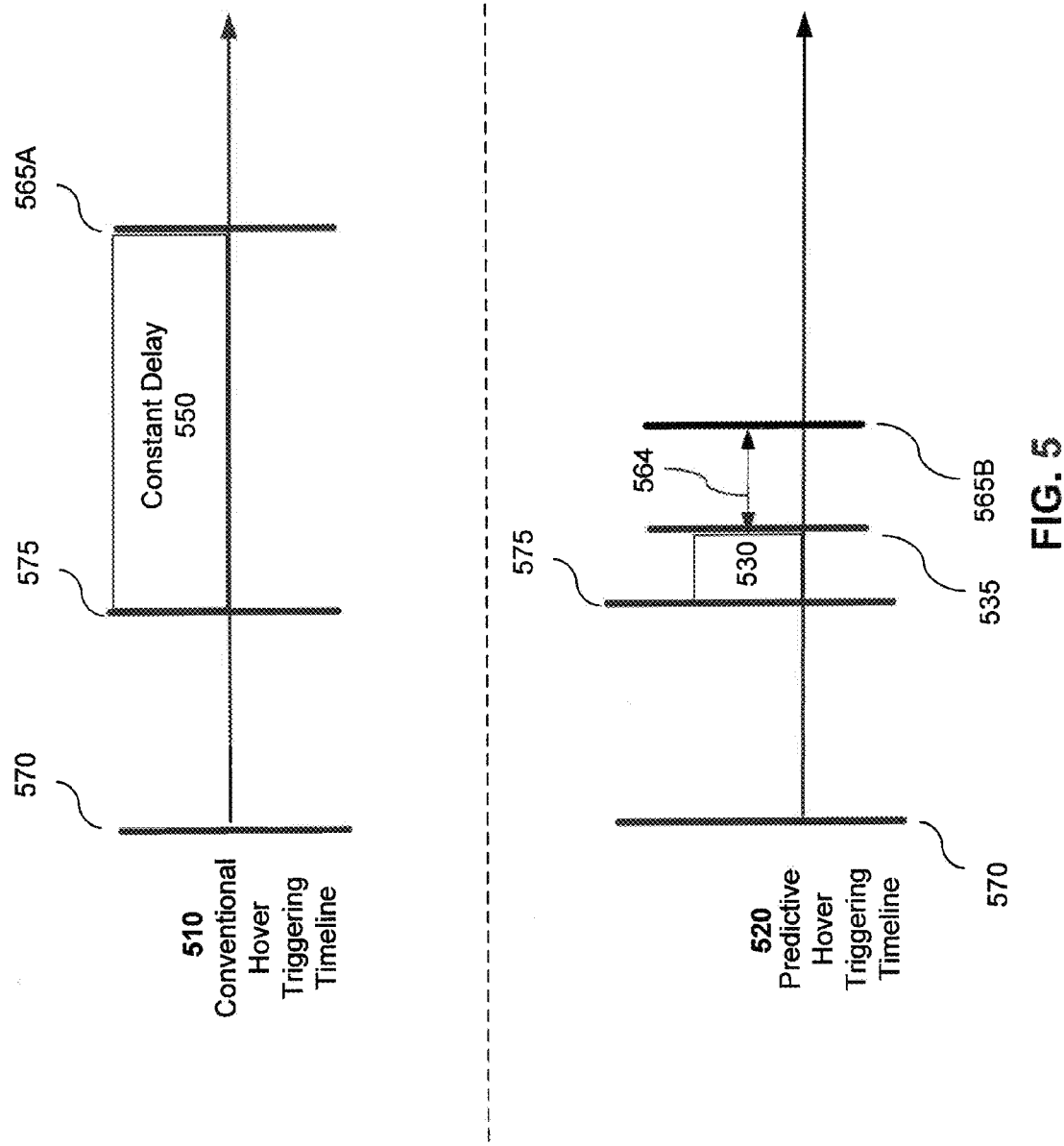

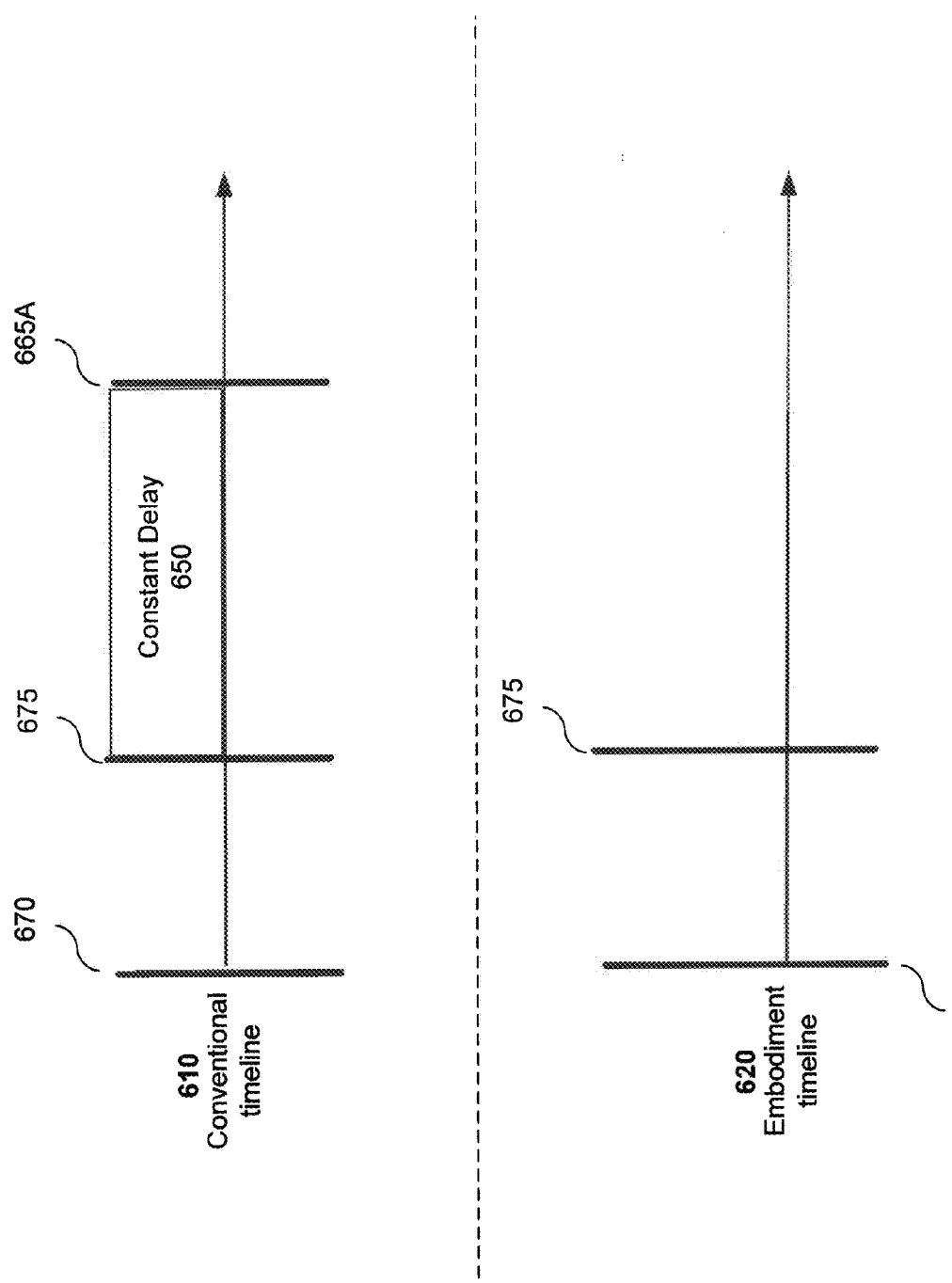

PREDICTIVE HOVER TRIGGERING

CROSS REFERENCE TO RELATED APPLICATIONS

This patent application claims the benefit of U.S. Provisional Patent Application No. 61/365,445 filed on Jul. 19, 2010, entitled "Anticipatory Hover Triggering," which is incorporated by reference herein in its entirety.

FIELD

The present application generally relates to user interfaces.

BACKGROUND

As user interfaces become more sophisticated, the "pointer hover" is becoming increasingly important. This user interface event is generally triggered when a user interface pointer is placed over an interface object. This pointer is typically controlled by a mechanical pointing device. This hover is typically used with groups of graphical objects, and allows a user to trigger an event without "clicking" on or otherwise selecting the object. As typically executed, no other user triggering action is required other than placing the pointer over the selected object.

This simplicity of execution however, can cause problems with complex interfaces. With the traditional implementation of the hover trigger, a typical problem results when multiple "hover-able" objects (object that can have this action applied to them) are placed in close proximity on an interface. If a user attempts to hover over one object, another object can be inadvertently hovered-over. User satisfaction can be negatively affected when an action occurs that a user has not intended. In addition to causing unwanted interface features to appear, such as a pop-up, user progress toward a goal is frustrated. As would be appreciated by one having skill in the relevant art, even a delay of several hundred milliseconds can cause significant user dissatisfaction.

One traditional solution to the inadvertent hovering over proximate hover-able objects is to introduce a delay in the triggering of the hover event. With this approach, even after the pointer of a user is placed on a hover-able hot-spot, a delay is implemented before the hover triggered even occurs. This approach generally reduces the occurrence of inadvertent hovers because of the delay.

The delay implemented with this approach however, is also implemented when a user intentionally hovers over an object. Just as with the inadvertent triggering—the event this delay was designed to prevent—this delay frustrates user progress towards their goal. Interface designers that implemented this delay approach are forced to balance the likelihood that a proximate object will be inadvertently hover triggered and user frustration with the delay. Even though the delay is typically very short, e.g., 500 milliseconds, this delay causes significant negative impact on user satisfaction. Because users vary in their perception of delay, their ability to steadily use a mouse and other pointer use characteristics, under the traditional approach, selecting a single delay number that will please the majority of users is difficult.

Therefore what is needed is improved methods, systems and computer program products that address the problems noted above.

BRIEF SUMMARY

Embodiments described herein relate to providing a method, system and computer program product for predictive triggering of a hover event for a pointer in a user interface on a display device.

According to an embodiment, a system for performing predictive hover triggering with a pointer on a user interface includes a data collector configured to collect a plurality of position points associated with the pointer. The collected plurality of position points are used by a trajectory determiner to determine a trajectory of the pointer, and an average velocity determiner to determine the average velocity of the pointer. A pointer predictor then uses the present position of the pointer and the collected plurality of position points to predict a future position of the pointer. A position analyzer then generates an intent condition based on the predicted future position of the pointer, the present position of the pointer and the position of a screen object. Once an intent condition is identified, a threshold determiner determines a verification threshold to be associated with the screen object and an intent verifier uses the determined threshold to verify the generated intent condition using the position analyzer and a timer. Upon the verification of the generated intent condition, a notifier notifies of the triggered event.

According to another embodiment, a method of triggering a hover event for a pointer in a user interface on a display device is provided. The method begins by predicting a future position of the pointer on the user interface. Based on this future position, a likelihood that the pointer will hover over a screen object is determined. Finally, a determination is made as to whether to trigger a hover event for the screen object based on the determined likelihood that the pointer will hover over the screen object.

Further features and advantages, as well as the structure and operation of various embodiments are described in detail below with reference to the accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIG. 3A illustrates the use of a predicted future position point for a pointer and a current position point for a pointer, according to an embodiment.

FIG. 3B illustrates an additional example of the use of a predicted future position point for a pointer and a current position point for a pointer, according to an embodiment.

FIG. 3C further illustrates the use of a predicted future position point for a pointer and a current position point for a pointer, according to an embodiment.

FIG. 3D illustrates yet another example of the use of a predicted future position point for a pointer and a current position point for a pointer, according to an embodiment.

FIG. 4A illustrates the relationship between the edges of a screen object and the use of a predicted future position point for a pointer and a current position point for a pointer.

FIG. 4B illustrates an additional example of the relationship between the edges of a screen object and use of a predicted future position point for a pointer and a current position point for a pointer.

FIG. 4C further illustrates the relationship between the edges of a screen object and the use of a predicted future position point for a pointer and a current position point for a pointer.

FIG. 4D illustrates yet another example of the relationship between the edges of a screen object and the use of a predicted future position point for a pointer and a current position point for a pointer.

FIG. 5 is a timeline comparing an embodiment to a traditional approach to hover triggering.

FIG. 6 is another timeline comparing an embodiment to a traditional approach to hover triggering.

DETAILED DESCRIPTION OF EMBODIMENTS

The following detailed description refers to the accompanying drawings that illustrate exemplary embodiments. Embodiments described herein relate to providing systems and methods for predictive hover triggering. Other embodiments are possible, and modifications can be made to the embodiments within the spirit and scope of this description. Therefore, the detailed description is not meant to limit the embodiments described below.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments will be described with the understanding that modifications and variations of the embodiments are possible, given the level of detail presented herein.

It should be noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art given this description to incorporate such a feature, structure, or characteristic in connection with other embodiments whether or not explicitly described.

I. Conventional Hover Triggers

Figure 1:
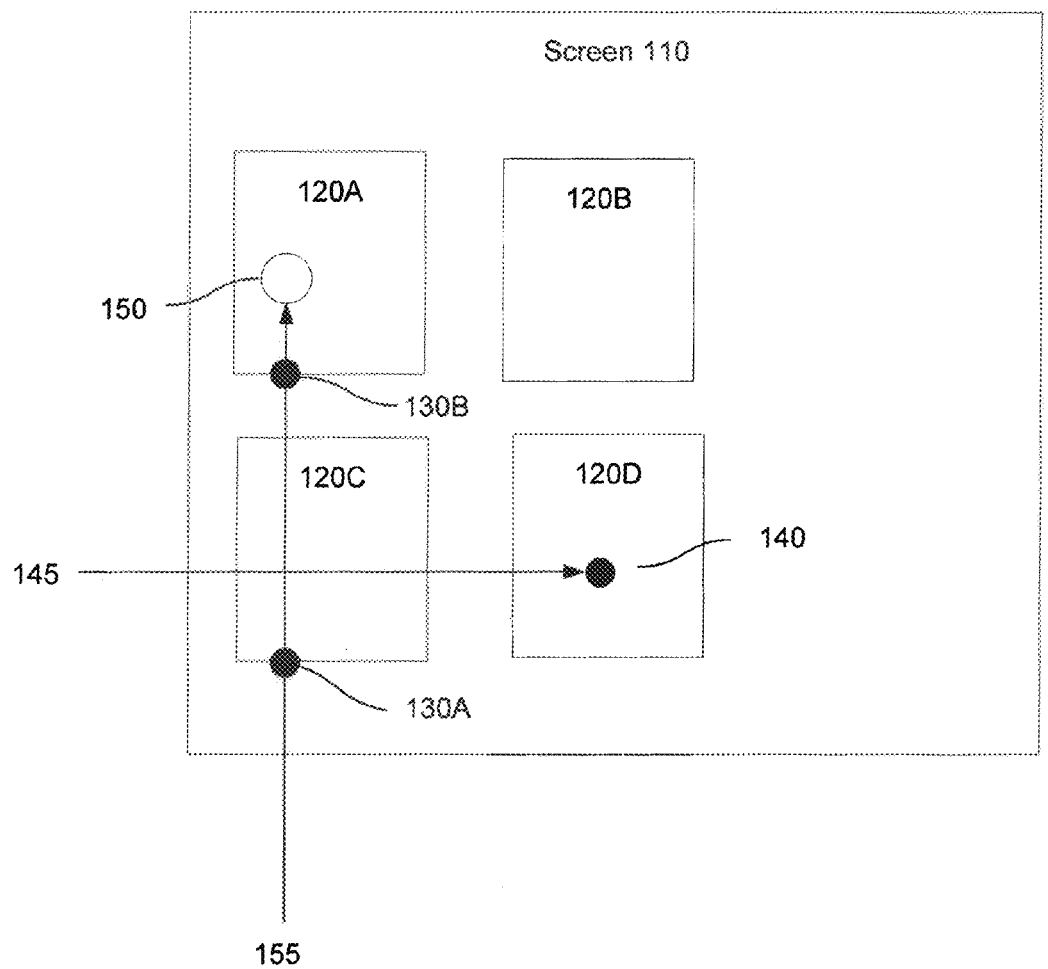
FIG. 1 illustrates two different approaches in a traditional hover trigger system.

FIG. 1 illustrates two different approaches in a conventional hover trigger system. The conventional approach to hover trigger events involves one or more hover-sensitive screen objects 120A-D, a user interface pointers 140, 150 having pointer paths 145 and 155 (i.e., the motion of the pointer as displayed on the interface) respectively. As used typically herein, a user interface pointer can be controlled by a mouse, trackball, optical mouse, touchpad or other pointing device, and is used to manipulate user interface objects.

Hover-sensitive screen objects 120A-D are typically objects that interface designers have set to be sensitive to a screen pointer moving over the object, but not clicking upon it. These objects may also be sensitive to other events, e.g., being clicked upon, but different actions can be set for each event.

When the programmed "hover" event occurs, a program feature can be set to occur. The causing of this hover-event is described typically herein as causing a "hover trigger." As noted above, some embodiments described herein offer improved methods of reducing improper hover triggers while reducing the latency of proper hover triggers.

As noted in the Background section above, traditional hover triggers can be set to trigger as soon as a pointer path crosses the object. As example of this is depicted on FIG. 1, with pointer path 155 moving to cross object 120C. Along track 155, point 130 depicts the first point at which this type of traditional hover trigger event occurs. As the pointer continues moving along track 155 toward finishing point 150, point 130B also causes a hover trigger to occur. As discussed in the Background, the improper hover trigger (130A) can negatively impact user happiness.

A traditional approach that attempts to remedy the problems of improper hover triggers is depicted on FIG. 1 with pointer path 145. In this approach, to reduce the likelihood that an improper hover trigger will occur, a delay is implemented between when a mouse pointer begins to hover over object 120D and the triggering event. The delay can be implemented in different ways, but generally it involves waiting to trigger the event until the pointer has remained within the target object for a fixed period of time. This time can vary, but an example is 500 milliseconds.

In example path 145, because the pointer has not remained stopped for the delay period when it crosses object 120C, no hover trigger event is caused. In this example, this approach has successfully eliminated the improper hover trigger discussed with the previous example.

When pointer path 145 reaches point 140 in the intended object 120D however, an interface problem is caused by the implemented delay. After the user stops moving the pointer at 140, the delay causes a perceived latency between the stopping and the hover trigger event. This situation can also negatively affect user happiness.

II. Overview of Embodiments

Some embodiments described herein implement hover triggering that predicts future pointer positions. For example, in accordance with an embodiment, pointer positions are observed and stored as a point moves within a user interface over time. The stored pointer positions are used to determine the velocity and trajectory of the pointer. Using the determined velocity and trajectory, a future pointer position can be predicted and/or estimated. When the predicted future pointer position is within a hover region continuously for a period of time, the hover event can be triggered. The result is a user interface that is both more responsive to intentional hovers and less jumpy when hovers are not intended.

Thus, in some exemplary embodiments, instead of triggering when the pointer has lingered for 500 milliseconds in a hover region, as with the approach described with FIG. 1, the hover event is instead triggered when the mouse is predicted to linger for 2000 milliseconds in the future. By observing the mouse trajectory frequently, assessment that allows for the requisite prediction can be done in about 100 milliseconds. A particular interface location without a screen object can also be sensitive to different events, and an embodiment can trigger these events as well.

III. Predicting Future Pointer Positions

Figure 2:
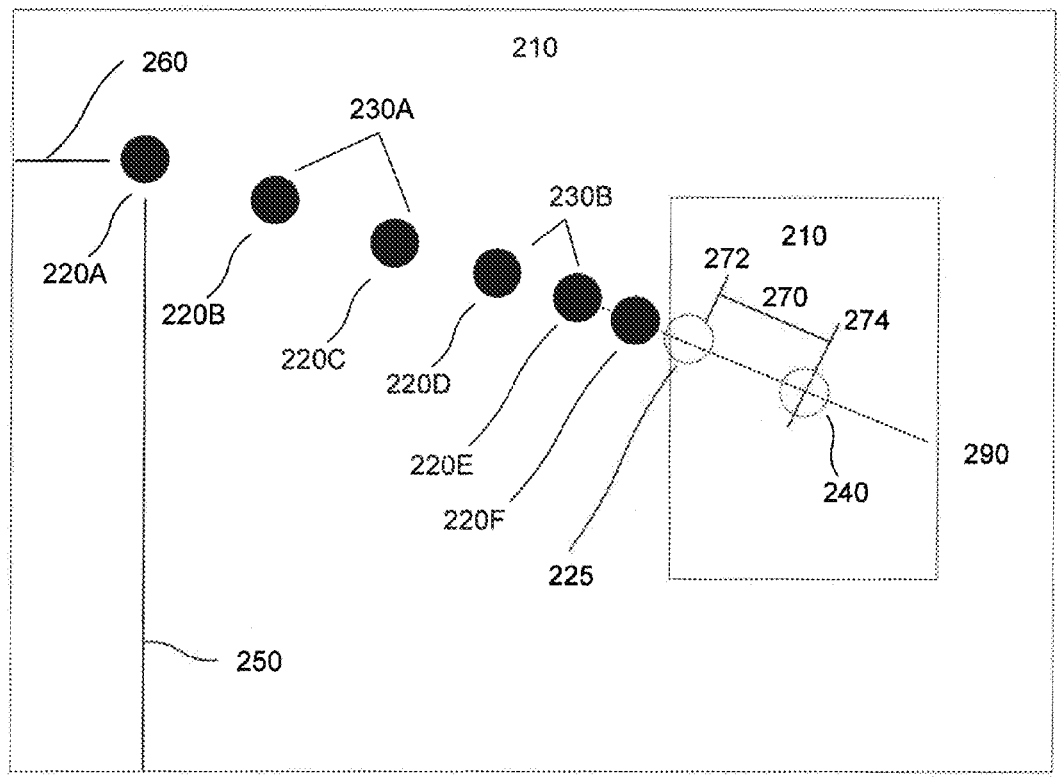
FIG. 2 illustrates the prediction of a future point for a pointer, according to an embodiment.

FIG. 2 illustrates an embodiment that predicts the future position of a pointer. FIG. 2 depicts several pointer position samples 220A-F taken over a period of time, and a current position 225 of the pointer. In an embodiment, the pointer position samples are X, Y values storing the position of the pointer on user interface screen 210 at a particular moment in time. For some embodiments below, position samples are taken of pointer position at different intervals. In an embodiment, the intervals are regular, taken at an interval that can capture very small changes in mouse movement, e.g., a sampling interval of an embodiment once every 20 milliseconds. Another sampling interval for another embodiment is once every 30 milliseconds. As would be appreciated by one having skill in the relevant art(s), with access to the teachings herein, different sampling intervals can be chosen for embodiments based on a balance between the processing cost and the performance of the implemented data models.

As would be appreciated by one having skill in the relevant art(s) given the present description, different approaches can be used to predict the position of a pointer in the future. Several different approaches are discussed below, and the characteristics of these approaches can be advantageously combined in different embodiments.

As depicted on FIG. 2 for example, pointer point 220A can be sampled and stored using the values of X 250 and Y 260 at point T=1. For convenience, this type of sample is discussed herein using the notation "(x,y,time)."

Because, in one example depicted on FIG. 2, these samples are taken at regular intervals, a larger distance between samples indicates a higher velocity than a smaller distance. For example, because, on FIG. 2 distance 230A between points 220B and 220C is shown as larger than distance 230B between 220D and 220E, the pointer velocity is slower during the 230B span.

The steps V1-V5 below are intended to be a non-limiting list of steps to implement an instantaneous velocity approach to predicting the future position of a moving pointer on interface screen 210 according to an embodiment.

V1. As the pointer moves, a running and exponentially decaying, weighted average of previous pointer position and time observations (e.g., as triplet (x,y,time)) is maintained. In an embodiment, the average is weighted such that the velocity of older samples becomes decreasingly significant to the average over time.

One embodiment implements this weighted average for each component of the (x,y,time) data point by using the following formula:

$$\text{new\_average} = (1-C) * \text{current sample} + C * \text{old\_average},$$

where $C=1/K$, such that each sample is weighted K times as much as the next older one.

In this embodiment, because no previous values are stored beyond the next older value, maintaining the running average is computationally inexpensive to implement, and there is no limit to the number of samples that can be used to determine predictions.

For example, at point 220C, the running weighted average is determined by using the (x,y,time) measurements for points 220A and 220B.

V2. As the pointer moves, use weighted average to continually estimate the instantaneous velocity (vx, vy) of the pointer, using the current (x,y,time) sample and the weighted average. As used herein, "continually estimate" includes an estimate determined on a periodic basis. The periodic basis can vary from an estimate determined as frequently as possible to an estimate determined at a longer interval.

V3. Predict the average velocity by using the weighted average of instantaneous velocity.

V4. Determine the trajectory using the samples collected. In the example depicted on FIG. 2, the (x,y,time) points 220E-F are used to determine trajectory 290. As would be appreciated by one having skill in the relevant art(s) given the description herein, different techniques and a different number of points can be used to determine trajectory 290.

V5. Combine the average velocity and the trajectory to predict the pointer position at a time in the future. For example, on FIG. 2, distance 270 (and thus point 274) can be determined based on the determined average velocity, starting point 272, the determined trajectory and the amount of time in the future at which a determination is required.

One having skill in the relevant art(s), given the description herein will understand that steps V1-V5 above offer one approach to estimating future pointer position.

Listed below is an example embodiment of the instantaneous velocity approach to predicting pointer position using JavaScript:

```
// parameters:
var avg = [NaN, NaN, NaN, NaN, NaN];
var lastx, lasty;                    // last observed mouse position.
// estimation:
var j, px, py,
    lastt = now( ),
    dt = lastt − avg[0],             // time since avg sample
    update = [
        lastt,                       // 0: time of sample
        lastx,                       // 1: sampled x position
        lasty,                       // 2: sampled y position
        (lastx − avg[1]) / dt,       // 3: sampled x velocity
        (lasty − avg[2]) / dt        // 4: sampled y velocity
    ];
// Update running averages of sample time, position, and velocity.
    for (j = 0; j < 5; ++j) {
        if (isNaN(avg[j])) avg[j] = update[j];
        else avg[j] = (1 − hysteresis) * update[j] + hysteresis * avg[j];
    }
// Predict the future x and y position based on average velocity.
px = lastx + (isNaN(avg[3]) ? 0 : predms * avg[3]);
py = lasty + (isNaN(avg[4]) ? 0 : predms * avg[4]);
```

Other approaches can be used to predict pointer position at a future point. Another approach to predicting future pointer position uses a linear regression analysis. In this embodiment, the collected data points and the trajectory from step V4 above are analyzed using linear regression analysis to predict a future data point.

Another approach that can be processing intensive, in an embodiment, is to use a least-squares fit to compute an estimate of the acceleration of the pointer. In this embodiment, the use of a higher-order polynomial model is able to model acceleration as well as velocity of the pointer.

It should be appreciated that approaches selected to predict future pointer positions may be selected, by an embodiment, based on the amount of processing required and the performance requirements of the user interface. A more accurate approach, for example, using current hardware configurations may be able to be used given the performance needs of the user interface.

As discussed below, once a future position of the pointer is determined, an embodiment combines the estimated future pointer position, the current pointer position and the characteristics of the hover object to determine whether to trigger the hover-event.

IV. Triggering Logic

FIG. 3A-D depict respectively multiple collected samples 310A-D, current pointer position 320A-D, pointer 330A-D, estimated (anticipated, predicted) pointer position 340A-D and hot region 390A-D (hover-eligible region, e.g., capable of causing the hover event to trigger). FIGS. 3A-D depict different approaches to triggering a hover trigger event when both the current pointer location and the future (estimated, predicted, projected) pointer location are within a hot region of a screen object.

As is discussed further below, for some embodiments, to increase reliability and reduce sensitivity to inadvertent triggering in the predictions, both locations need to remain within the hot region continuously for a timed period of time (e.g., using a timer, as discussed below) before the hover trigger event occurs. An example minimum amount of time for triggering used in an embodiment is 130 milliseconds.

FIGS. 3A and 3B depict example conditions that suggest that a user is intending to hover on hot regions 390A-B respectively. Collected samples 310A-B, by their proximity, suggest a slow moving pointer. In the examples depicted on FIGS. 3A-B, predicted pointer positions 340A-B represent the predicted position of the pointer at a moment two seconds in the future. In different embodiments, other estimation times (e.g., 3 seconds, ½ second) can be used to different advantageous effect.

It should be noted that the pointer positions 320A-B and the estimated pointer position 340A-B are depicted by these examples as being both inside the respective hot regions 390A-B. In an embodiment, at the point that both these points (330A-B, 340A-B) are in the relevant hot region, a timer starts. This timer continues during the time that these points remain together in the hot region 390A-B, and if one or both of the points leave the hot region, then the timer resets. The timer continues counting until being reset or a trigger threshold is reached. Once the trigger threshold is reached, according to an embodiment, a hover-event is triggered.

The trigger threshold, in an embodiment, can be pre-determined—set to balance between speed and reducing the likelihood of unintended hover-events. In another embodiment, the trigger threshold can be dynamically adjusted based on an assessment of user pointer skill. For example, if it is noted that a user triggers a short hover event over one object, then immediately triggers a sustained hover event over an adjacent object, it may be determined, by an embodiment, that the user needs additional threshold time. In other embodiments, discussed with FIGS. 4A-5B and FIG. 7, the trigger threshold can be altered for other advantageous purposes.

In contrast to the examples depicted with FIGS. 3A-B, the example conditions depicted with FIGS. 3C-D suggest a user in not intending to hover on hot regions 390C-D, according to an embodiment. Collected samples 310C-D, by their distance from each other suggest a fast moving pointer trail. In the examples depicted on FIGS. 3C-D, predicted pointer position 340C-D also represent the estimated position of pointer 330C-D at a moment two seconds in the future.

It should be noted that predicted pointer position 340C-D is not inside of hot region 390C-D at the time of the estimation. While not dispositive, this lack of presence inside hot region 390C-D is an indication in some embodiments, that a hover trigger is not appropriate. The combination of the estimated fast velocity and current position 320C-D of pointer 330C-D, the determined trajectory of pointer 330C-D (not shown) and the estimated pointer position 340C-D are used by an embodiment to not trigger a hover event.

Further discussion below, with FIGS. 3E-4D, describe the use of predicted pointer position 340A-D in additional detail.

Figure 3E:
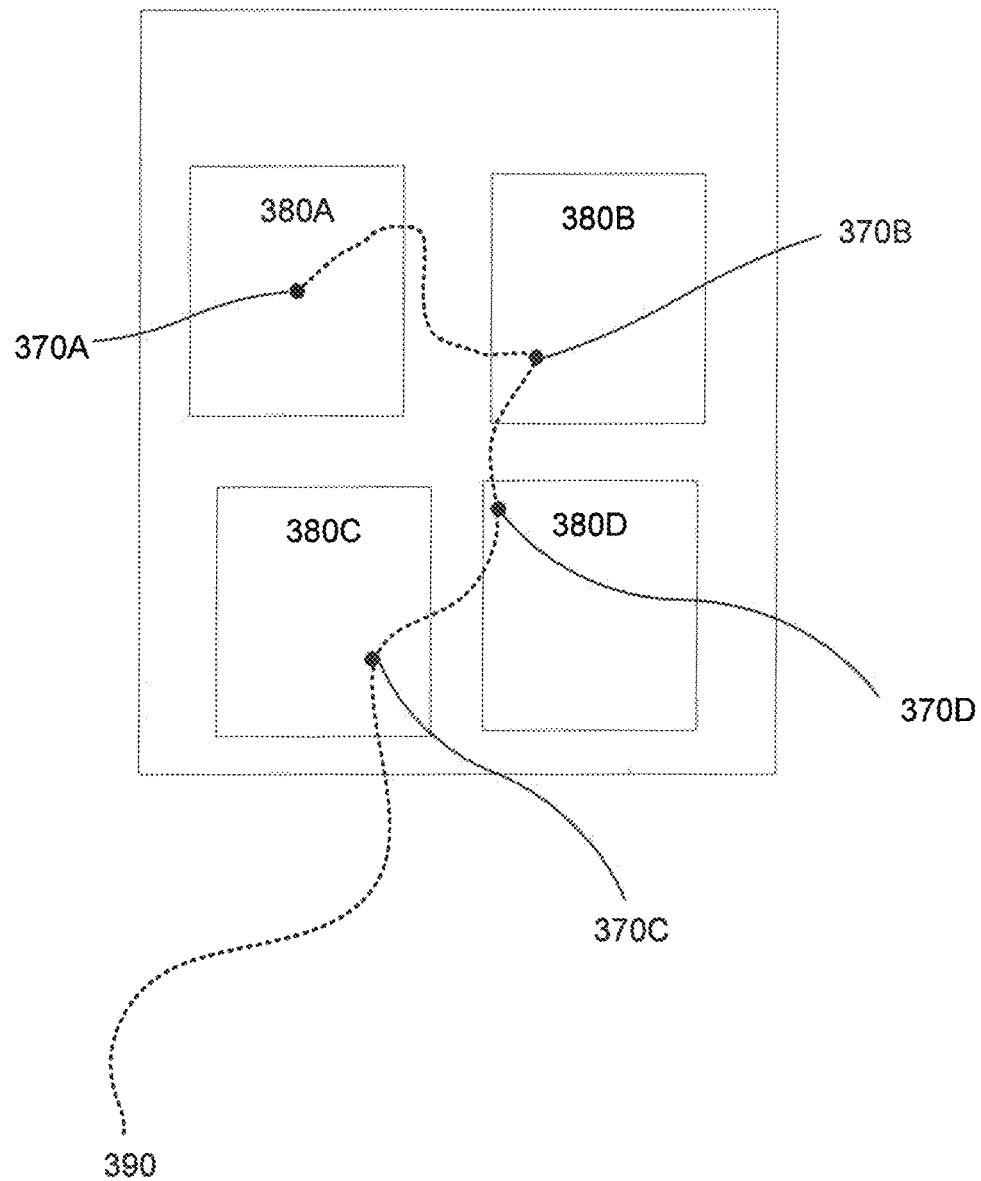
FIG. 3E illustrates predictive hover triggering with multiple screen objects, according to an embodiment.

FIG. 3E illustrates predictive hover triggering with multiple screen objects, according to an embodiment. As would be appreciated by one having skill in the relevant art(s) given this description, when using pointers users often cannot move in straight lines, or keep the pointer in small "gutter" areas between objects. An example depicted on FIG. 3 shows pointer path moving among and between several screen objects 380A-D. In this example, the user intends to hover over screen object 380A, and to accomplish this, the user moves the pointer so as to avoid the other objects 380B-D. Pointer path 390 depicts a path that is not successful in avoiding screen objects 380B-D.

In an embodiment, prediction points 370A-D represent predictions determined by one of the prediction approaches described above, such as instantaneous velocity. Some embodiments described herein are designed to avoid improper hover triggering during pointer movements similar to pointer path 390. Prediction points 370B-D represent prediction points that could potentially be confused by an embodiment for actual user intent. An embodiment described herein is designed to reduce the likelihood that points 370B-D are selected.

Because prediction points 370B-D are on a portion of pointer path 390 where, in this example, a user is attempting to avoid hovering over the unselected screen objects (380D-D), the prediction points are close to the edge of their respective screen objects—especially as compared to the actual user-intended prediction point 370A. The characteristics of pointer path 390, such path having inadvertent hovering and intentional hovering areas shown, would be appreciated by one having skill in the relevant art(s) given this description.

Because of the position characteristics noted above, in an embodiment, the prediction approach to future pointer positioning considers the distance of the pointer prediction point from the edge of the screen object when considering the likelihood that the pointer prediction represents user intent. In an embodiment, this relevance of the prediction point to the edge of a screen object is termed "edge sensitivity."

One approach, taken by an embodiment for reducing the edge sensitivity of screen objects is to raise the trigger threshold (as discussed with FIGS. 3A-B) associated with the edges of a screen object as compared to the center of the screen object. Thus, on FIG. 3E, prediction point 380D has a higher trigger threshold, and user-intended prediction point 370A has the lowest trigger threshold of all the prediction points 370A-D depicted.

FIGS. 4A-D depict four types of example "edge relationships." The edges discussed in this section refer to the edge of the screen object and the relationship refers to the relationship between the current pointer position, the estimate of the pointer position at a future point, and the distance from the edge of the screen object. Consideration of the factors of FIGS. 4A-D can give an embodiment additional user interface features (e.g., "a more natural and responsive feel") that can increase user happiness.

Similar to FIGS. 3A-D, FIGS. 4A-D depict respectively collected samples 410A-D, current pointer position 420A-D, predicted (anticipated, estimated) pointer position 440A-D and hot region 450A-D (hover-eligible region, e.g., capable of causing the hover event to trigger). Additionally, FIGS. 4A-D depict an "edge" region 460A-D. For convenience, as described herein, for an embodiment that has an edge region (FIGS. 4A-D), the center area that is not a part of the edge region is termed a "non-edge" region, such as non-edge region 465A-D. FIGS. 4A-D depict different approaches to triggering a hover trigger event when both the current pointer location and the future (estimated, predicted, projected) pointer location are within a hot region of a screen object.

In an embodiment, the edge region is similar to the edge described with FIG. 3E above. As noted above, this edge represents in some embodiments, a qualitatively different region of the screen object. In these embodiments for example, this qualitative different means a larger degree of manifested intent is required from a user to trigger the hover trigger event.

In an embodiment, the edge region may include the portion of an object that is an absolute distance from the edge of the object, e.g., a 36 pixel band from each edge. In another embodiment, the absolute distance may be different for different edges, e.g., 32 from the top and 64 from the sides of the screen object.

In yet another embodiment, the "edge" may be variable, changing the threshold of required intent pixel-by-pixel the farther away from the edge that the predicted point is located. In an example, as discussed above, the trigger threshold can be used to require a longer pause from the user before the hover-event is triggered. With the variable edge approach, additional time can be incrementally subtracted from the trigger threshold the farther from the edge that a predicted pointer position is located.

In another embodiment, a variable crediting of elapsed time approach is implemented. In this approach, for a particular portion of the screen object, instead of counting seconds off a counter toward a triggering threshold a millisecond at a time, only a portion of a millisecond is deducted, such portion being related to the distance the current pointer is from the edge of the screen object.

For an example of this variable approach, consider an example of a screen object that would ordinarily require a 130 milliseconds threshold (both the predicted pointer position and current pointer position staying in the hot region for 130 ms to trigger the hover event). In this example, a 36 pixel band is used around the screen object, and the counting ratio within the band is 1/36 of the current pointer position. Thus if the current pointer position is 1 pixels away from the edge, then 1/36 of a millisecond is counted off the required 130 ms threshold time. Termed differently, in this example embodiment, triggering the hover event by satisfying the threshold will take 130*36 ms (4680 ms).

As would be appreciated by one having skill in the relevant art(s), different variations of the above-described spatial oriented variable threshold approach could be advantageously implemented in different embodiments. In an embodiment, instead of a band of pixels, the distance from the edge can be extended to the center of the object.

FIG. 4A depicts an example situation where though current pointer position 440A is inside hot region 450A. However, because predicted pointer position 440A is outside hot region 450A, an embodiment does not trigger the hover trigger event. It should be noted that the hover-event is not triggered notwithstanding the current pointer position 420A being near the center of the object, e.g., not in edge 460A.

FIG. 4B depicts an example that is the converse of FIG. 4A. In the example depicted in FIG. 4B, both the current pointer position 420B and the predicted pointer position 440B are within the non-edge portion of screen object 450B. It should be noted that, in contrast to the long trail of samples depicted by 410A in FIG. 4A (indicating higher velocity), this example depicts a shorter, denser trail of samples 410B. For example, the shorter distance between each collected sample 410B indicates the pointer was traveling at a slower speed during collection. In an embodiment, upon the detection of both current pointer position 420B and predicted pointer position 440B being in non-edge portion 465B, the hover trigger event would be triggered based on a trigger threshold (e.g., 130 ms).

While the examples depicted on FIG. 4A-B represent more definite cases for some embodiments, FIGS. 4C-D represent relatively more ambiguous cases, e.g., it can be more difficult to determine user intent from the collected and determined data points.

FIG. 4C, for example can be termed "the entering edge case." In this example, an embodiment has predicted a future pointer position 440C inside non-edge portion 465C of screen object 450C, while present pointer position 420C is inside the edge portion 460C of screen object 450C.

In this example, an embodiment tries to select from at least two possible intents of the user. The listed items A1-A2 below are non-exhaustive and non-limiting assessments of user actions:

A1. The user's actions could be an accidental move where the user intends to continue to move the pointer outside screen object 450C to an adjacent area.

A2. The actions of the user could also be the beginning of an intentional move where the user intends to trigger the hover event by lingering in screen object 450C.

Because of potential intention A1, an embodiment does not select a low trigger threshold (e.g., trigger quickly). Conversely, because A2 is a possibility, an embodiment does not suppress hover triggering entirely.

In an embodiment, this example can benefit advantageously from the variable threshold counting detailed above. In this example, only a fraction of the time is counter off a timer while current pointer position 420C is in edge region 460C. In other words, before triggering the hover-event, an embodiment requires more evidence of intent from a user by extending the amount of time that the mouse and the projected point both need to remain in the hot region.

In FIG. 4D a similar ambiguity is presented by an example termed, by an embodiment, "the exiting edge case." In this example as depicted, an embodiment has predicted a future pointer position 440D that has exited non-edge portion 465D of screen object 450D. Future pointer position 440D is inside edge portion 460D of screen object 450D, while present pointer position 420D is inside the non-edge portion 465D of screen object 450D.

In this example, an embodiment also tries to select from at least two possible intents of the user. The listed items B1-B2 below are non-exhaustive and non-limiting assessments of user actions:

B1. The user's actions could manifest an intent to continue to move the pointer outside screen object 450D to an adjacent area. If this were the case, the slow moving actions of the user could potentially erroneously satisfy the trigger threshold.

B2. The user's actions could manifest an intent to slow down their pointer movement and remain in the bounds of screen object 450D.

Because the user's intent is ambiguous between B1 and B2, in an embodiment, a higher trigger threshold is selected. This example can also benefit advantageously from the variable threshold determination detailed above. It is important to note that, in an embodiment, predicted pointer position 440D in non-edge region 456D causes a lower trigger threshold as compared to when predicted pointer position 440D is in edge region 460D. Certain portions of screen objects 450C-D have different levels of significance for predicting additional pointer positions 440C-D.

As used in this example, and with the variable examples above, this reduction in significance for certain features (e.g., pointer position in the object) is termed a demotion rule. As would be appreciated by on having skill in the relevant art(s), given this description, this demotion rule approach could be applied to other factors deemed relevant in the determination of user intent to hover.

FIG. 5 depicts two parallel timelines that show a conventional hover triggering timeline 510, and predictive hover triggering timeline 520. Both timelines show hover triggering using a pointer moving on a user interface.

The constant delay approach to conventional hover triggering, as described above with FIG. 1, is shown on conventional timeline 510. An embodiment using predictive hover triggering is shown in comparison on parallel timeline 520. On both timelines, point 570 indicates a user beginning to move a pointer on a user interface screen. For this example, the user is moving the pointer toward a screen object that is sensitive to hover trigger events.

At point 575 on both timelines (510, 520), the pointer enters the boundaries of a hover-able screen object. As illustrated in predictive hover triggering timeline 520, process 530 is depicted as starting as soon as the pointer enters the screen object a point 575. In an embodiment, process 530 is looking for an intent condition. In this example, the intent condition found at point 535 is the presence of both the current pointer and the predicted pointer position in the screen object. In this example at point 535, because the pointer is in the screen object and an intent condition has been detected, threshold timer 564 commences. Once threshold timer 564 has completed, at point 565 the hover event is triggered and a popup menu is displayed, according to an embodiment.

In contrast to the rapid hover triggering at point 565B of the embodiment above, as depicted on conventional timeline 510, at point 575 the conventional approach begins constant delay 550. In the conventional approach, constant delay 550 is used to confirm that the object being lingered upon is intended to be the target of a hover trigger event. After constant delay 550, at point 565A the intended hover-event is triggered and a programmatic feature is commenced. As depicted on FIG. 5, this programmatic event is the display of a pop-up on the user interface.

FIG. 6 depicts an example of an erroneous hover trigger event that can occur in a conventional approach to hover triggering, and an avoidance of the erroneous event by an predictive hover triggering embodiment. As with FIG. 5, FIG. 6 depicts two parallel timelines that show a conventional timeline 610, and an embodiment timeline 620. Both timelines show hover triggering using a pointer moving on a user interface.

At point 670 in this example, the pointer begins moving for both timelines (610, 620). At point 675 in this example, on both timelines, the pointer accidently enters the hot region of a screen object. On timeline 610, in this example, as discussed above, a timer based on constant delay 650 is commenced in response to point 675. As discussed herein, at point 675, an embodiment notes the potential for an intent condition, and performs steps to verify the intent condition.

In this example, the user moves the pointer slowly over the screen object. In timeline 610, this slow pointer movement causes the constant delay 650 to expire, and at point 665A, an intrusive pop-up window is erroneously displayed. On timeline 620, in the example embodiment, notwithstanding the slow movement of the pointer, the embodiment is not able to verify the potential intent condition and the popup is not displayed.

Figure 7:
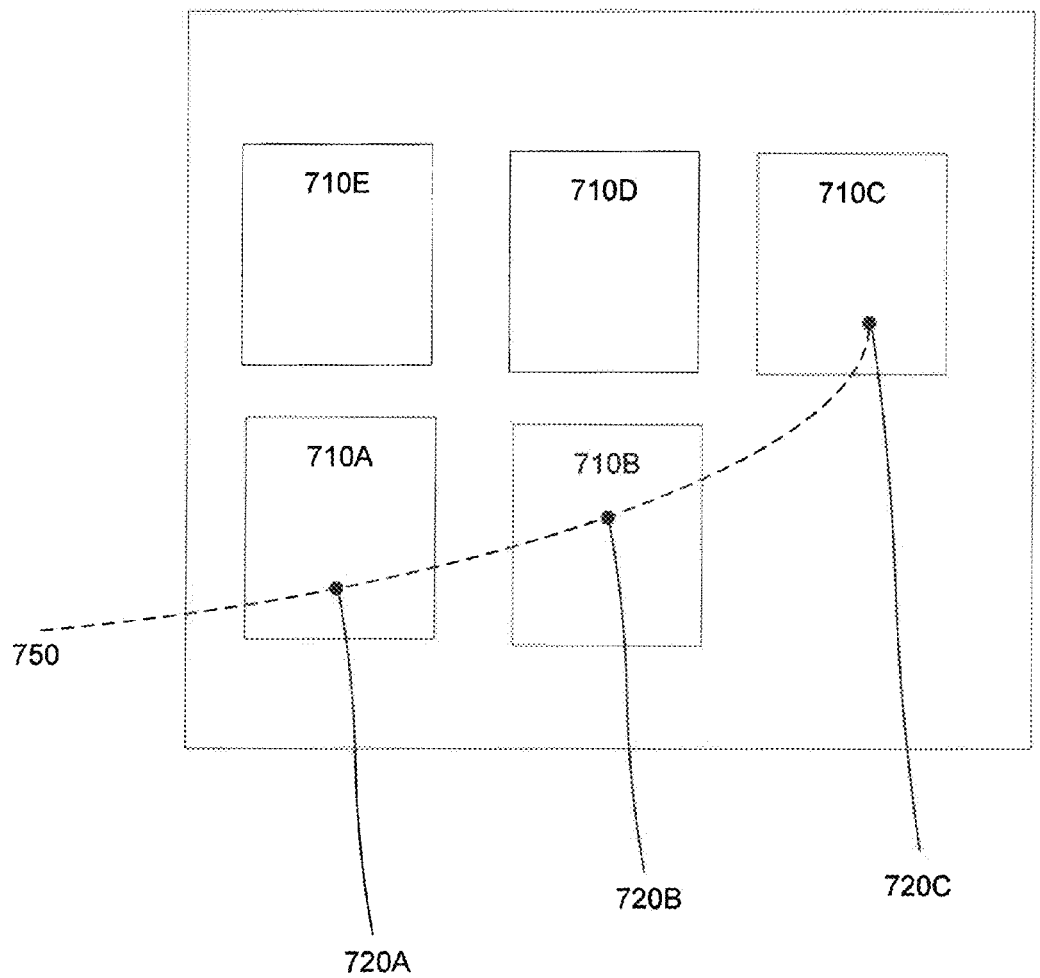
FIG. 7 illustrates predictive hover triggering using weighted screen objects, according to an embodiment.

FIG. 7 illustrates predictive hover triggering using weighted screen objects, according to an embodiment. FIG. 7 depicts screen objects 710A-E, points 720A-C and pointer track 750. In an embodiment, the popularity of each of the screen objects 710A-E is known, and the popularity of each object is used to alter the amount of determined intent needed to trigger a hover event for the object. As would be appreciated by one having skill in the relevant art(s) given the description herein, popularity can be determined, for example, in applications such as image search. In this example FIGS. 710A-E are each images that users are invited to select as a search result. Having one image selected (e.g., 710C) more than another (e.g., 710B) causes the determined popularity of the more selected image to be higher.

In an embodiment, a historically less popular screen object is less likely to be hovered over in future interactions. Thus, the popularity rating can be advantageously integrated into the predictive hover trigger approaches discussed above with FIGS. 2-5B. One approach taken by an embodiment is to alter the amount of estimated linger time required to cause a hover event based on the popularity of the relevant screen object.

For example, if screen object 710B has a popularity rating of 5 out of 10 and screen object 710C has a popularity rating of 8 out of 10, an embodiment can require a longer amount of estimated linger time for screen object 710B (the less popular object) before the trigger event is caused for that object. Screen object 710B can require 200 millisecond of estimated linger time, for example, while 710C can require only 100 milliseconds. Because more popular items are presumably hovered upon more often, this approach can act to frequently increase the hover performance of an embodiment.

Figure 8:
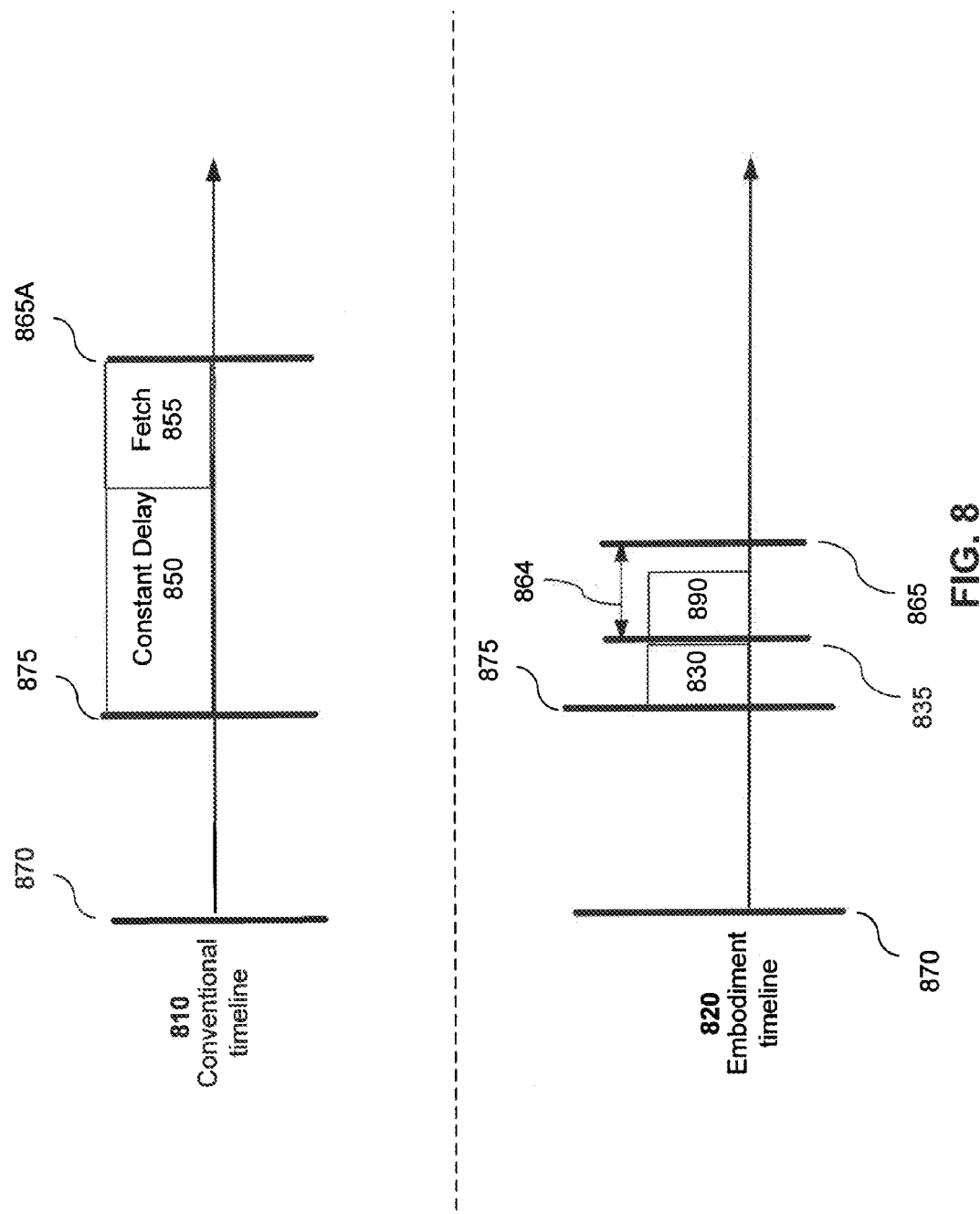
FIG. 8 is a timeline comparing an embodiment that uses predictive prefetching to a traditional approach to hover triggering.

FIG. 8 depicts two parallel timelines that compare embodiment timeline 820 using predictive hover prefetching to a conventional timeline 810 using a conventional hover triggering approach.

As discussed with the FIG. 5-6 timelines above, the constant delay 850 approach to conventional hover triggering, as described above with FIG. 1, is shown on conventional timeline 810. An embodiment using predictive hover triggering with pre-fetching is shown in comparison on parallel timeline 820.

At point 875 on both timelines (810, 820), the pointer enters the boundaries of a hover-able screen object. On embodiment timeline 820, process 830 is depicted as starting as soon as the pointer enters the screen object a point 875. In an embodiment, process 830 is looking for an intent condition.

In this example, according to an embodiment, an intent condition is found at point 835 and threshold timer interval 864 commences to verify the intent condition. As an additional feature, after the intent condition of point 835 is detected, in an embodiment, a pre-fetch 890 is performed wherein data that could be required by hover trigger event 865

(e.g., a pop-up window) is retrieved into memory. This pre-fetch 890 is performed, in an embodiment, after an interval that is less than the threshold timer interval 864 required to trigger hover-event 864. In an embodiment depicted on FIG. 8, the described pre-fetch 890 can occur immediately after the intent condition at point 835 is detected. In this example, when the trigger threshold is reached at point 865, pop-up pre-fetched by prefetch 890 is displayed for the user It should be noted that the data retrieved from pre-fetch 890 may never be needed (e.g., the pointer may continue moving and the intent condition may not be verified), but an embodiment balances this potentially unused processing against the potential for performance gains in other circumstances.

In contrast to this, on conventional timeline 810, after the pointer enters the hot region at point 875, constant delay 850 and fetch 860 are performed. Not until point 865 does the pop-up display for the user as a result of their actions.

As would be appreciated by a person having skill in the relevant art(s), given the description herein, additional, advantageous actions can be taken to improve user happiness given the time advantages enabled by some embodiments described herein.

Figure 9:
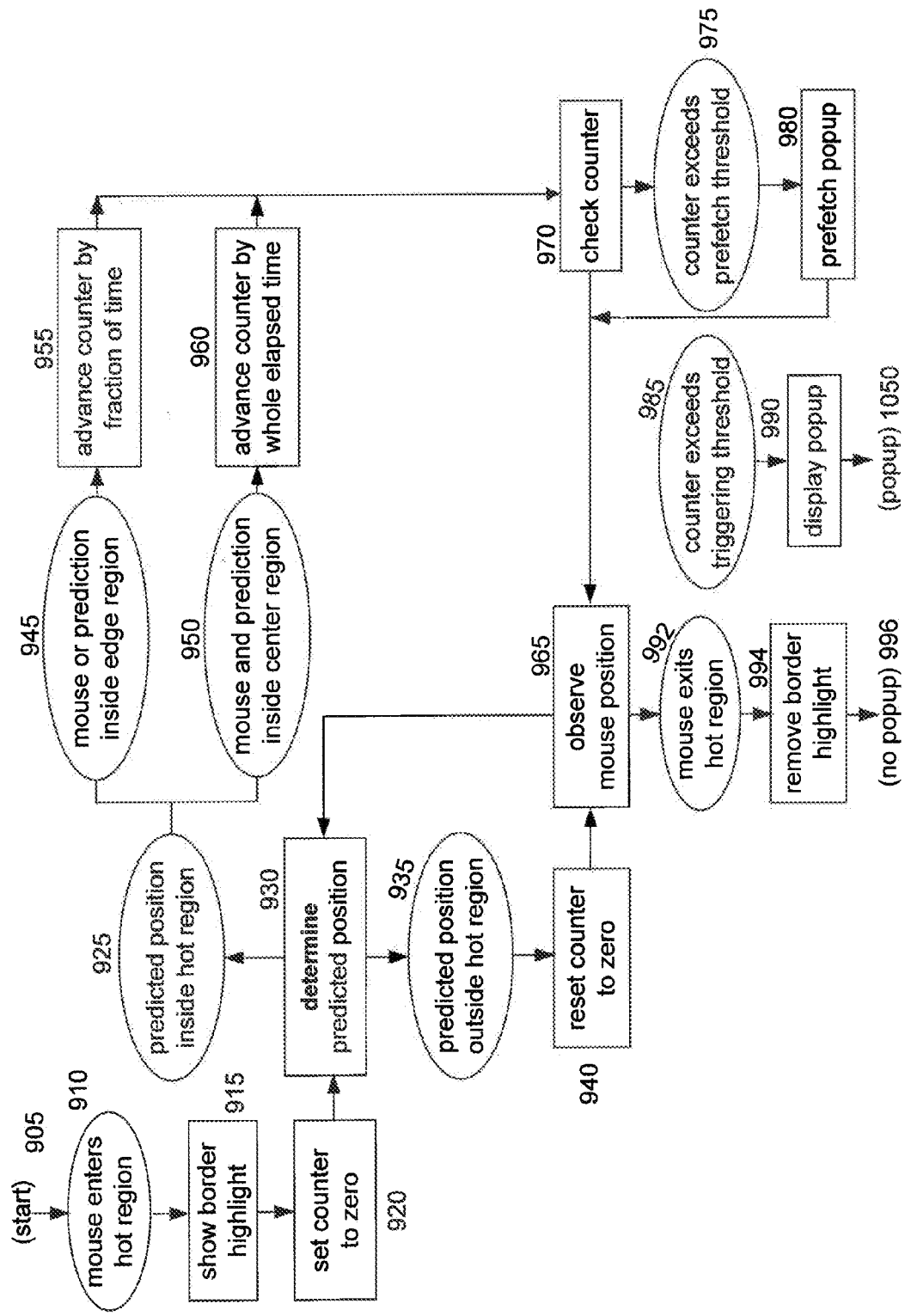
FIG. 9 is a flowchart that illustrates aspects of an embodiment.

FIG. 9 is a flowchart that illustrates aspects of an embodiment. For this embodiment, the pointer discussed elsewhere herein is controlled by a mouse. The flowchart of FIG. 9 uses mouse and pointer interchangeably.

The steps begin at step 905 and at step 910, the mouse enters the hot region of a screen object. At step 915, to highlight the object for the user, a border highlight for the screen object is displayed and at step 920, a counter is reset to zero. At step 930, a predicted position for the mouse pointer is determined and if, at step 925, the predicted position is inside the hot region, a further determination is made, at step 945 of whether either the current mouse pointer position or the predicted mouse pointer position are inside the edge region of the screen object. At step 950, a similar determination is made as to whether either the current mouse pointer position or the predicted mouse pointer position are inside the center (or non-edge) region of the screen object.

If the determination of step 945 is true, then at step 955, the counter is advanced by a fraction of time, else if the determination of step 950 is true, the counter is advanced by a whole increment of elapsed time. After these determinations 945, 950, the counter is checked at step 970 to determine whether the present value of the counter exceeds a pre-fetch threshold. In an embodiment, this prefetch threshold is a threshold (less than the threshold required to trigger the pop-up) that causes a pre-fetching process to be undertaken in preparation for the potential display of a pop-up window (or other programmatic feature). As would be apparent to one having skill in the relevant art(s), given this description, this lesser threshold could be used to perform additional beneficial tasks before a hover event.

If, at step 975, the counter exceeds the prefetch threshold, at step 980, the pop-up window is pre-fetched into memory in preparation for potential display. After the checking step of 970, a check is performed at step 985 to determine is the counter exceeds the triggering threshold, and if this determination is made, at step 990, the pop-up is displayed. The flow then ends at step 1050.

If, at step 985, the counter is determined not to exceed the triggering threshold, the current mouse position is observed at step 965. At step 992, if the current mouse position is observed to have exited the hot region then, at step 994 the border highlight is removed from the screen object and at step 996, the flow ends with no pop-up display.

If, at step 965, the current mouse position is observed to still be in the hot region, then the process loops back to step 930, where an additional predicted mouse position is determined. The process continues until one of the terminating events (e.g., 996, 1050) noted above.

V. Other Applications

Figure 10A:
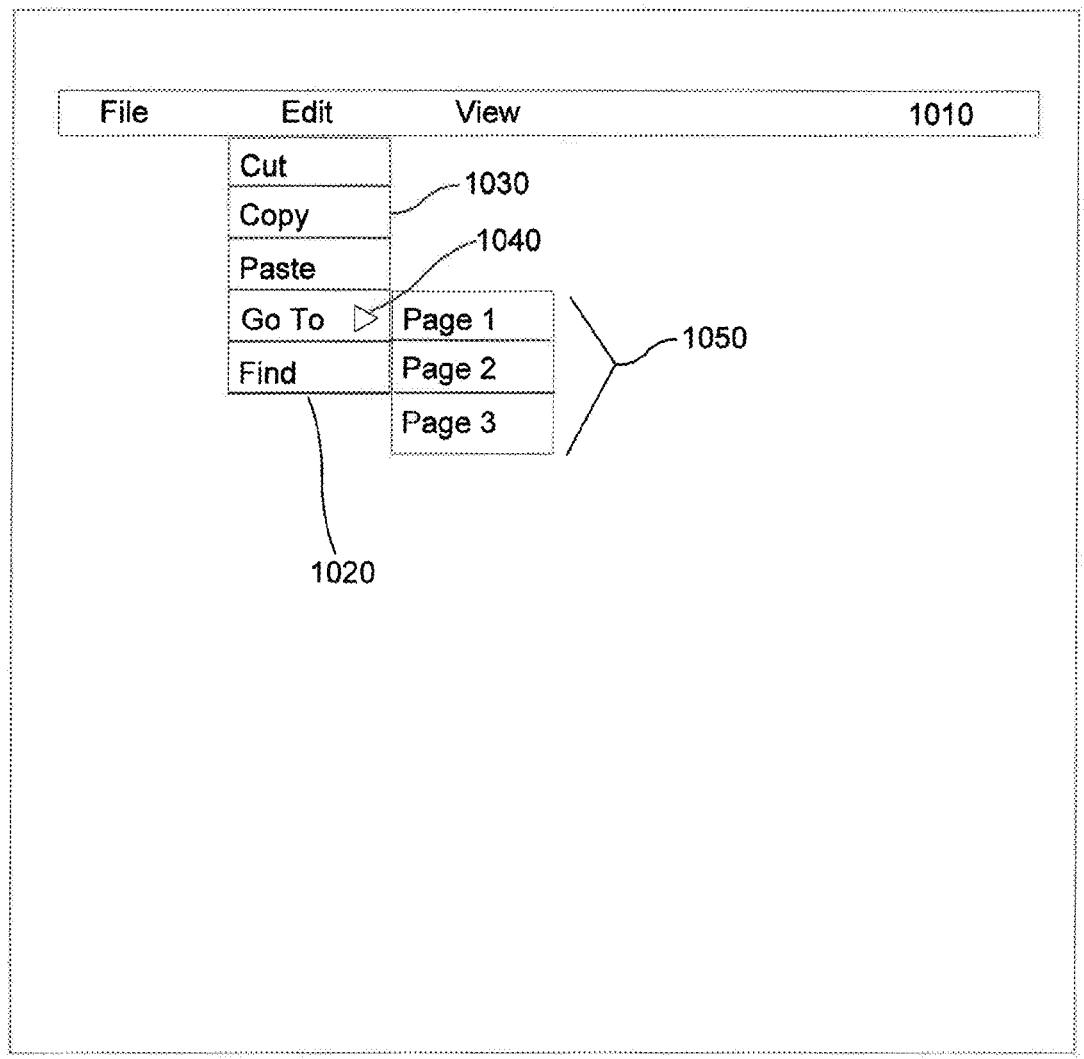
FIG. 10A depicts a pull-down menu structure that uses predictive hover triggering to launch sub-menus, according to an embodiment.

FIG. 10A depicts a pull-down menu structure 1010 that uses predictive hover triggering to launch sub-menus, according to an embodiment. As would be appreciate by one having skill in the relevant art(s), conventional 'pull down' menu 1010 uses a variation of the hover behavior described in FIG. 1 above. FIG. 10A includes pull down menu 1010, such menu having an "edit" menu that includes both a non-hover enabled menu item 1030 (Copy) and a hover-enabled submenu item ("Go To 1040").

As used conventionally, if a user wants to execute a menu command that is part of a submenu, one approach available to a user is first to click to open the base menu (e.g., "Edit") using a pointer, then move the pointer down to the submenu enabled entry (e.g., Go To 1040). Conventionally, these submenu entries are labeled by a single black triangle.

When the pointer reaches the submenu item, equivalent in many ways to the operation of a conventional constant delay hover trigger as described in FIG. 1. The pointer moves over the words, a short pause is commenced and after such pause, the submenu (e.g., page 1, page 2, page 3) is displayed. In many circumstances, the delay in displaying the submenu can cause a decrease in user happiness.

An embodiment described herein can be used to address the above noted submenu performance issue. Using the same approach to predictive hover triggering discussed with FIGS. 2-3 herein, the display of the submenu can, in an embodiment, be increased in speed.

In an example depicted on FIG. 10A, after the user clicks on "Edit" and begins to quickly move their pointer down the menu, once the pointer arrives at the border of Go To 1040, an embodiment commences looking for intent conditions. Example conditions include a predicted future position of the pointer. As described with FIG. 4D above, this predicted position helps to determine whether the pointer is going to stop at "Go To 1040," or pass on to "Find 1020."

Once an intent condition in determined in this example, a threshold is applied as described in embodiments above. Because of the dynamics of a pull down menu, in an embodiment, this threshold would be very short.

One adjustment that could be made to the threshold in an embodiment, involves the weighted screen object concept introduced with FIG. 7 above. Just as the screen object (e.g., pictures) in that example were weighted according to their popularity, so too could menu items on a pull down menu be weighted. If, for example it is determined that "Find 1020" is a more popular command than "Go To 1040," then the threshold required to trigger the hover-event for "Go To 1040" would be increased.

In another embodiment, the edge relationship concept could also be applied to the hover trigger threshold for pull down menu items. In this embodiment, having the pointer closer to the center of a menu item could reduce the threshold required to trigger a hover event for that menu item. Just as with the examples in FIGS. 4A-D, having a pointer near the edge of a screen object may indicate that the pointing to that object is inadvertent.

Figure 10B:
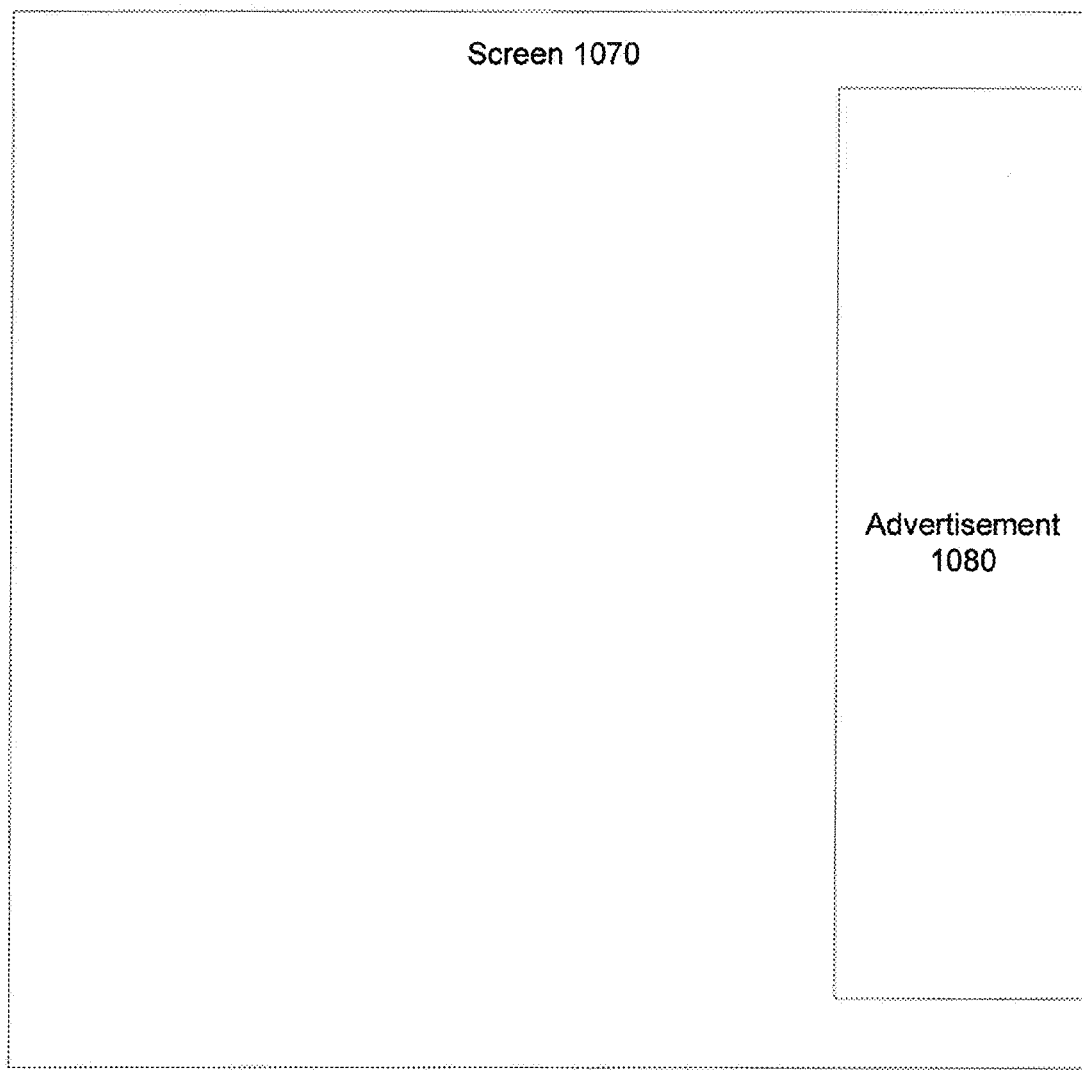
FIG. 10B depicts an advertisement that uses an embodiment to predict hover triggering, according to an embodiment.

On FIG. 10B, an example is depicted where an embodiment is used on screen 1070 with advertisement 1080. As would be appreciated by one having skill in the relevant art(s), advertisers are sensitive to user happiness when users are interacting with and proximate to, user interface advertisements, such as advertisement 1080.

An embodiment described herein, by using predictive hover triggering to reduce the incidence of improper hover trigger actions associated with advertisement 1080, such as screen-blocking pop-ups, users will have a better view of advertisement 1080 and potentially the advertiser as well. Additionally, when a user does intend to hover over advertisement 1080, using an embodiment to improve the speed with which advertisement 1080 responds can be helpful.

VI. System 1100

Figure 11:
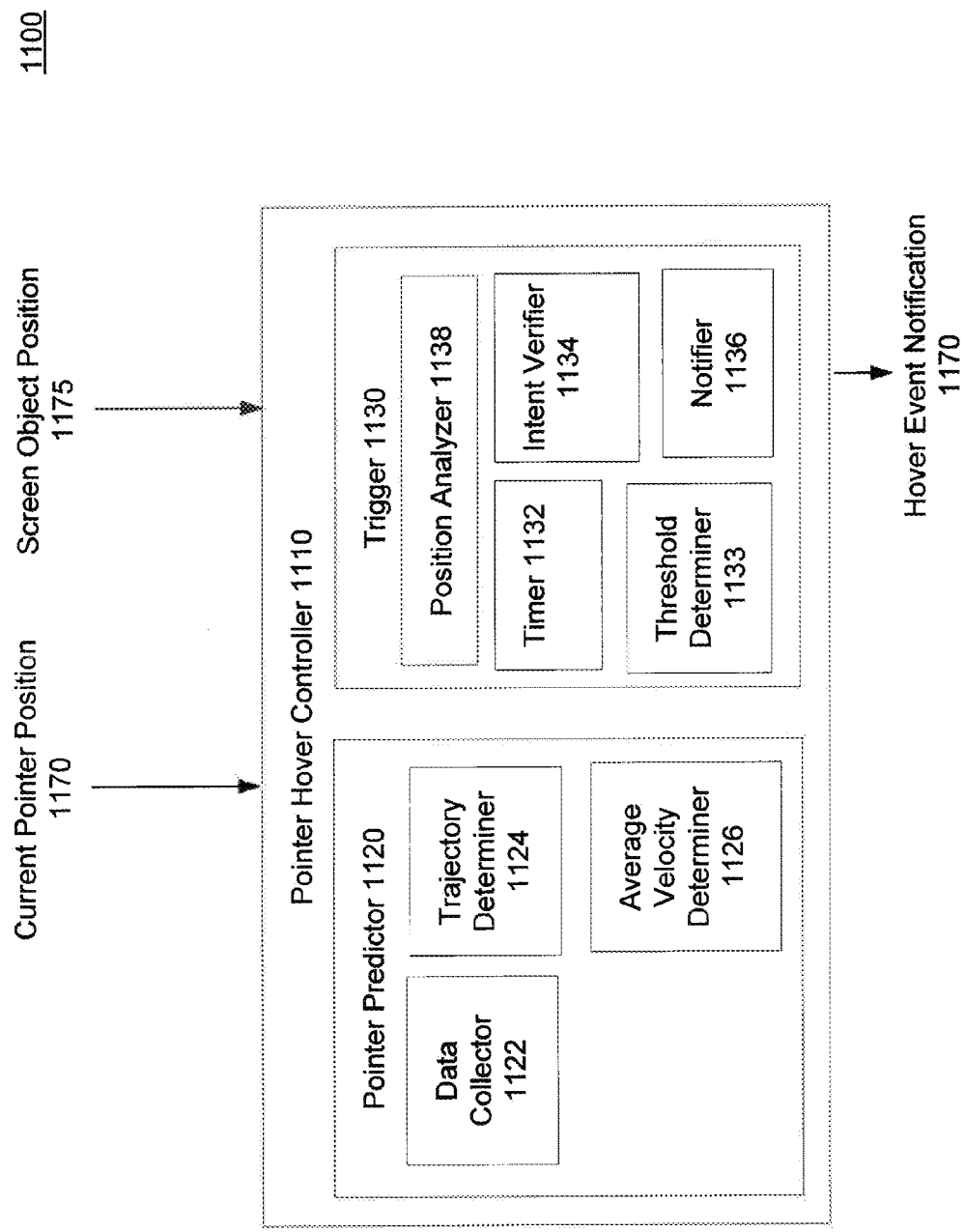
FIG. 11 is a block diagram of system for performing predictive hover triggering with a pointer on a user interface, according to an embodiment.

FIG. 11 depicts system 1100 having pointer hover controller 1110 for implementing a hover event in a user interface. As depicted, an embodiment of pointer hover controller 1110 receives current pointer position 1170 and screen object position 1175, and includes pointer predictor 1120 and trigger 1130. An embodiment of pointer predictor 1120 includes data collector 1122, trajectory determiner 1124 and average velocity determiner 1126. Trigger 1130 includes position analyzer 1138, timer 1132, intent verifier 1134, threshold determiner 1133 and notifier 1135. Pointer hover controller 1110 further includes a hover event notification output.

According to an embodiment, system 1100 for performing predictive hover triggering with a pointer on a user interface uses data collector 1122 to collect a plurality of position points associated with the pointer. The collected plurality of position points are used by trajectory determiner 1124 to determine a trajectory of the pointer, and average velocity determiner 1126 to determine the average velocity of the pointer. Pointer predictor 1120 then uses the present position of the pointer and the collected plurality of position points to predict a future position of the pointer. Position analyzer 1138 then generates an intent condition based on the predicted future position of the pointer, the present position of the pointer and the position of a screen object. Once an intent condition is identified, Threshold determiner 1133 determines a verification threshold to be associated with the screen object and intent verifier 1134 uses the determined threshold to verify the generated intent condition using position analyzer 1138 and timer 1132. Upon the verification of the generated intent condition, notifier 1136 notifies of the triggered event.

VII. Method 1200

Figure 12:
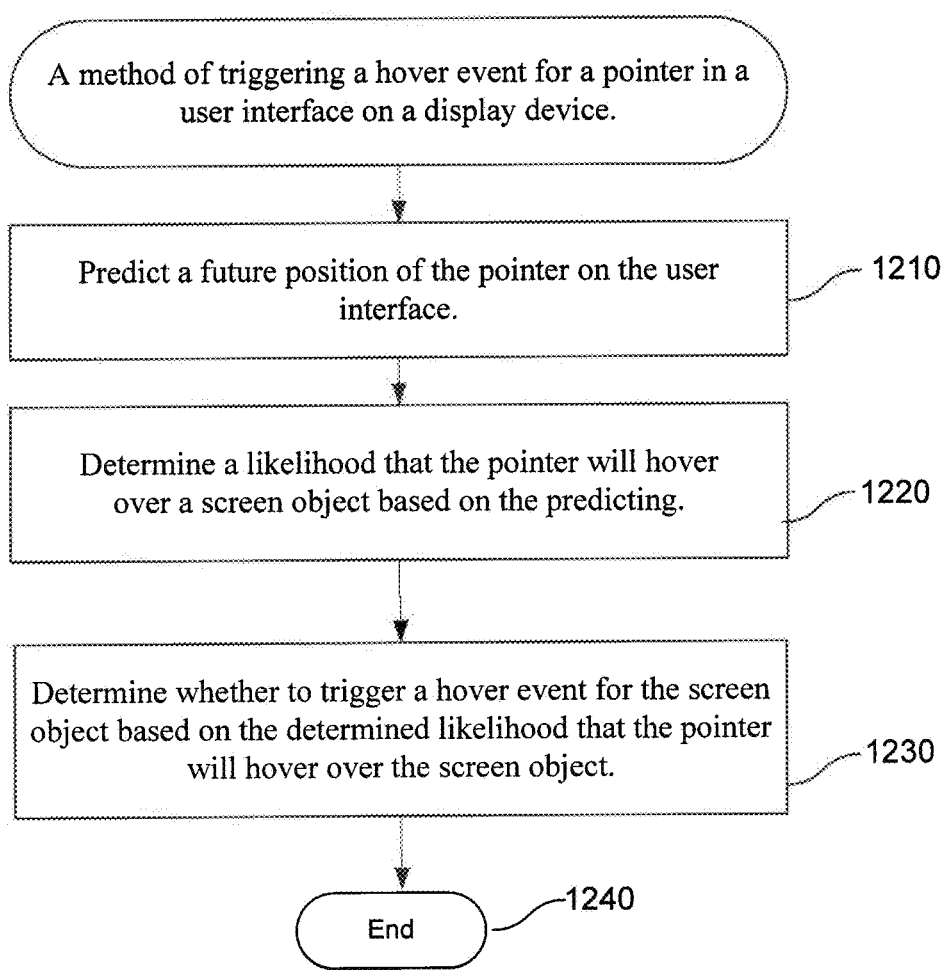
FIG. 12 illustrates a flowchart of a method of triggering a hover event for a pointer in a user interface on a display device, according to an embodiment.

FIG. 12 illustrates a more detailed view of how embodiments described herein may interact with other aspects of embodiments. In this example, a method of triggering a hover event for a pointer in a user interface on a display device is shown. Initially, as shown in stage 1210, the future position of the pointer on the user interface is determined. At stage 1220, a likelihood that the pointer will hover over a screen object is determined based on the predicting of stage 1210. At stage 1230, a determination is made as to whether to trigger a hover event for the screen object based on the determined likelihood that the pointer will hover over the screen object of stage 1220. At stage 1240, the method ends.

VIII. Example Computer System Implementation

Figure 13:
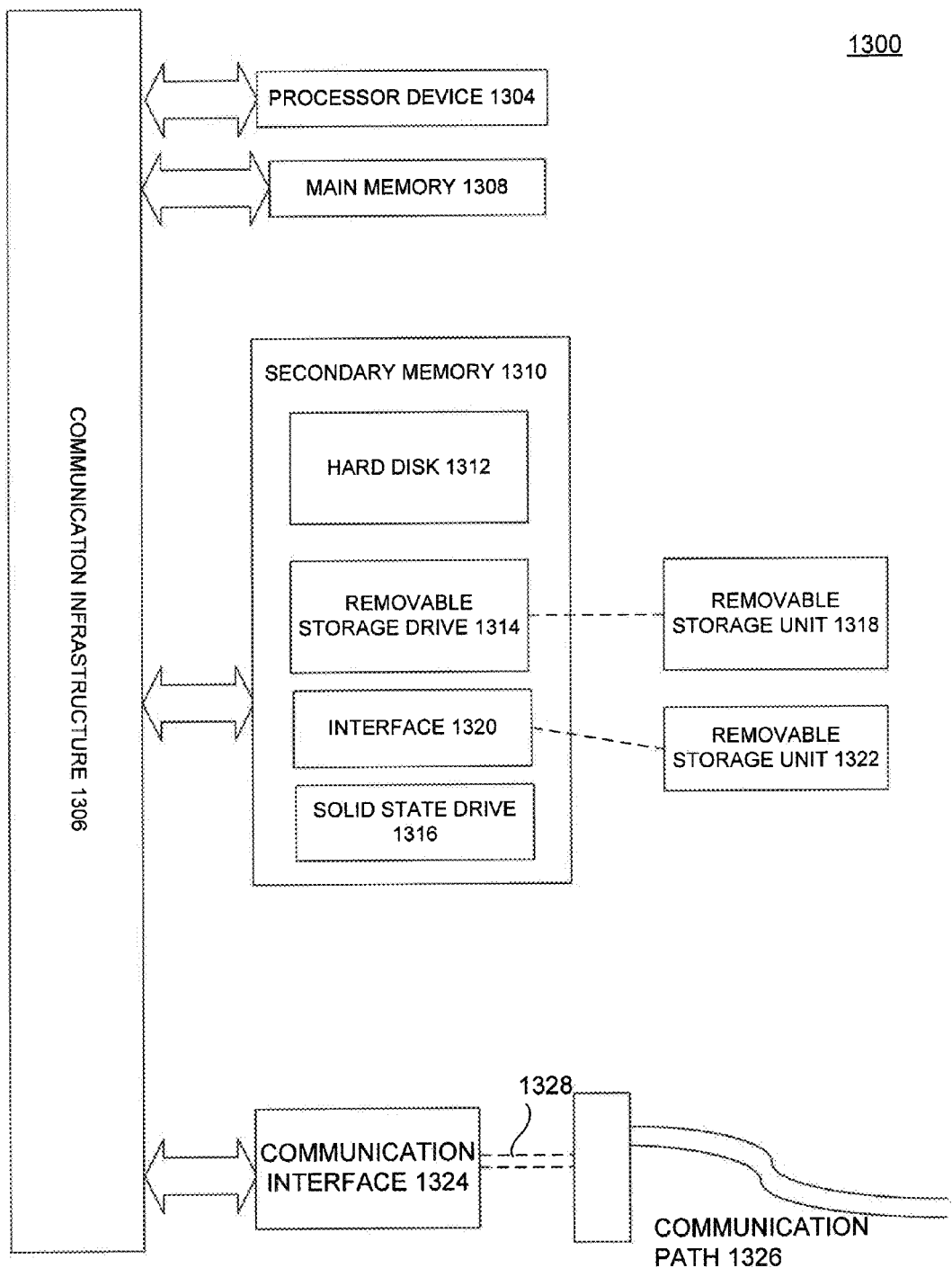
FIG. 13 depicts a sample computer system that can be used to implement an embodiment.

FIG. 13 illustrates an example computer system 1300 in which embodiments, or portions thereof, may be implemented as computer-readable code. For example, portions of systems or methods illustrated in FIGS. 2-11, may be implemented in computer system 1300 using hardware, software, firmware, tangible computer readable media having instructions stored thereon, or a combination thereof and may be implemented in one or more computer systems or other processing systems. Hardware, software or any combination of such may embody any of the modules/components in FIG. 11 and any stage of method 1200 illustrated in FIG. 12.

If programmable logic is used, such logic may execute on a commercially available processing platform or a special purpose device. One of ordinary skill in the art may appreciate that embodiments of the disclosed subject matter can be practiced with various computer system and computer-implemented device configurations, including smartphones, cell phones, mobile phones, tablet PCs, multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the invention are described in terms of this example computer system 1300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 1304 may also be a single processor in a multi-core/multiprocessor system, such system operating alone, or in a cluster of computing devices operating in a cluster or server farm. Processor device 1304 is connected to a communication infrastructure 1306, for example, a bus, message queue, network or multi-core message-passing scheme.

Computer system 1300 also includes a main memory 1308, for example, random access memory (RAM), and may also include a secondary memory 1310. Secondary memory 1310 may include, for example, a hard disk drive 1312, removable storage drive 1314 and solid state drive 1316. Removable storage drive 1314 may include a floppy disk drive, a magnetic tape drive, an optical disk drive, a flash memory, or the like. The removable storage drive 1314 reads from and/or writes to a removable storage unit 1318 in a well known manner. Removable storage unit 1318 may include a floppy disk, magnetic tape, optical disk, etc. which is read by and written to by removable storage drive 1314. As will be appreciated by persons skilled in the relevant art, removable storage unit 1318 includes a computer readable storage medium having stored therein computer software and/or data.

In alternative implementations, secondary memory 1310 may include other similar means for allowing computer programs or other instructions to be loaded into computer system 1300. Such means may include, for example, a removable storage unit 1322 and an interface 1320. Examples of such means may include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1300.

Computer system 1300 may also include a communications interface 1324. Communications interface 1324 allows software and data to be transferred between computer system 1300 and external devices. Communications interface 1324 may include a modem, a network interface (such as an Ethernet card), a communications port, a PCMCIA slot and card, or the like. Software and data transferred via communications interface 1324 may be in the form of signals, which may be electronic, electromagnetic, optical, or other signals capable of being received by communications interface 1324. These signals may be provided to communications interface 1324 via a communications path 1326. Communications path 1326 carries signals and may be implemented using wire or cable, fiber optics, a phone line, a cellular phone link, an RF link or other communications channels.

In this document, the terms "computer program medium" and "computer readable medium" are used to generally refer to media such as removable storage unit 1318, removable storage unit 1322, and a hard disk installed in hard disk drive 1312. Computer program medium and computer readable medium may also refer to memories, such as main memory 1308 and secondary memory 1310, which may be memory semiconductors (e.g., DRAMs, etc.).

Computer programs (also called computer control logic) are stored in main memory 1308 and/or secondary memory 1310. Computer programs may also be received via communications interface 1324. Such computer programs, when executed, enable computer system 1300 to implement the present invention as discussed herein. In particular, the computer programs, when executed, enable processor device 1304 to implement the processes of the present invention, such as the stages in the method illustrated by flowchart 800 of FIGS. 8A-C discussed above. Accordingly, such computer programs represent controllers of the computer system 1300. Where the invention is implemented using software, the software may be stored in a computer program product and loaded into computer system 1300 using removable storage drive 1314, interface 1320, hard disk drive 1312 or communications interface 1324.

Embodiments also may be directed to computer program products comprising software stored on any computer useable medium. Such software, when executed in one or more data processing device, causes a data processing device(s) to operate as described herein. Embodiments employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

IX. Conclusion

Embodiments described herein relate to methods and apparatus for improving pointer hover events in a user interface. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is clamed is:

1. A method of triggering a hover event for a pointer in a user interface on a display device, comprising:
   predicting a future position of the pointer on the user interface;
   determining a likelihood that the pointer will hover over a screen object based on the predicting; and
   determining whether to trigger a hover event for the screen object based on the determined likelihood that the pointer will hover over the screen object, wherein determining whether to trigger the hover event comprises:
     identifying an intent condition based on the assessment of the user's intent, wherein the intent condition is maintained for a threshold amount of time;
     adjusting the threshold amount of time to maintain the identified intent condition; and
     upon verifying that the intent condition is maintained for the adjusted threshold amount of time, determining to trigger the hover event.

2. The method of claim 1, wherein predicting the future position of the pointer comprises predicting the future position of the pointer based on a velocity and a trajectory of the pointer.

3. The method of claim 1 further comprising: determining the instantaneous velocity of the pointer based on stored position values of the pointer, wherein predicting the future position of the pointer comprises predicting the future position of the pointer based on the determined instantaneous velocity of the pointer.

4. The method of claim 3, further comprising: determining the average velocity of the pointer based on the determined instantaneous velocity of the pointer, wherein predicting the future position of the pointer further comprises predicting the future position of the pointer based on the determined average velocity of the pointer.

5. The method of claim 1 further comprising: determining the trajectory of the pointer based on stored position values of the pointer, wherein predicting the future position of the pointer comprises predicting the future position of the pointer based on the determined trajectory of the pointer.

6. The method of claim 1, wherein determining whether to trigger a hover event for the screen object comprises determining to trigger a hover event for the screen object when the predicted future pointer position is located within the bounds of the screen object, the intent condition indicating that a user potentially intends to hover over the screen object.

7. The method of claim 1, wherein verifying that the intent condition is maintained for a threshold amount of time comprises verifying that the intent condition is maintained for a threshold based on the current position of the pointer relative to an edge of the screen object.

8. The method of claim 1, wherein verifying that the intent condition is maintained for the adjusted threshold amount of time comprises verifying that the intent condition is maintained for a threshold based on the predicted future position of the pointer relative to an edge of the screen object.

9. The method of claim 1, wherein verifying that the intent condition is maintained for the adjusted threshold amount of time comprises verifying that the intent condition is maintained for a threshold based on a characteristic of the screen object.

10. The method of claim 9, wherein verifying that the intent condition is maintained for the adjusted threshold based on a characteristic of the screen object comprises verifying that the intent condition is maintained for a threshold based on the popularity of the screen object.

11. The method of claim 1 wherein determining a likelihood that the pointer will hover over a screen object comprises determining a likelihood that the pointer will hover over an advertisement.

12. A system for performing predictive hover triggering with a pointer on a user interface, comprising: a timer, a memory, and a processor coupled to the memory, the processor being configured to collect a plurality of position points associated with the pointer; determine a trajectory of the pointer based on the collected plurality of position points; determine the average velocity of the pointer based on the collected plurality of position points; predict the future position of the pointer based on the present position of the pointer and the collected plurality of position points; generate an intent condition based on the predicted future position of the pointer, the present position of the pointer and the position of a screen object; verify the generated intent condition using the position analyzer and the timer; and notify, upon the verification of the generated intent condition, of a triggered event, wherein determining whether to trigger the event comprises the processor being further configure to:
identify the intent condition, wherein the intent condition is maintained for a threshold amount of time;
adjust the threshold amount of time to maintain the identified intent condition; and
upon verify that the intent condition is maintained for the adjusted threshold amount of time, determining to trigger the hover event.

13. The system of claim 12, wherein the characteristic is the predicted future position of the pointer relative to an edge of the screen object.

14. The system of claim 12, wherein the characteristic is the popularity of the screen object.

15. An apparatus comprising a non-transitory computer readable medium encoding instructions thereon that, in response to execution by a computing device, cause the computing device to perform a method of triggering a hover event for a pointer in a user interface on a display device, comprising: predicting a future position of the pointer on the user interface; determining a likelihood that the pointer will hover over a screen object based on the predicting; and determining whether to trigger a hover event for the screen object based on the determined likelihood that the pointer will hover over the screen object, wherein determining whether to trigger the hover event comprises:
identifying an intent condition based on the assessment of the user's intent, wherein the intent condition is maintained for a threshold amount of time;
adjusting the threshold amount of time to maintain the identified intent condition; and
upon verifying that the intent condition is maintained for the adjusted threshold amount of time, determining to trigger the hover event.

* * * * *